(12) United States Patent
Kawamura et al.

(10) Patent No.: US 7,293,194 B2
(45) Date of Patent: Nov. 6, 2007

(54) METHOD AND DEVICE FOR SWITCHING DATABASE ACCESS PART FROM FOR-STANDBY TO CURRENTLY IN USE

(75) Inventors: Nobuo Kawamura, Atsugi (JP); Yozo Ito, Tokyo (JP); Makoto Takada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 322 days.

(21) Appl. No.: 11/076,917

(22) Filed: Mar. 11, 2005

(65) Prior Publication Data
US 2006/0129772 A1 Jun. 15, 2006

(30) Foreign Application Priority Data
Dec. 9, 2004 (JP) ............................. 2004-357397

(51) Int. Cl.
G06F 11/00 (2006.01)
G06F 12/00 (2006.01)
(52) U.S. Cl. ..................... 714/7; 714/4; 714/5; 714/47; 707/202; 707/204; 711/162
(58) Field of Classification Search .................. 714/47, 714/2, 5, 4, 7; 707/204, 202; 711/162
See application file for complete search history.

(56) References Cited

U.S. PATENT DOCUMENTS 6,976,066 B1 * 12/2005 Mouhanna et al. ......... 709/223
7,051,052 B1 * 5/2006 Shapiro et al. ............. 707/204
2004/0078397 A1 * 4/2004 Mehta et al. ............... 707/202
2004/0120262 A1 * 6/2004 Hirose et al. ............... 370/252
2004/0260899 A1 * 12/2004 Kern et al. .................. 711/162
2005/0015407 A1 * 1/2005 Nguyen et al. ............. 707/200
2005/0028024 A1 * 2/2005 Kataoka et al.
2005/0144197 A1 * 6/2005 Kan et al.
2005/0256952 A1 * 11/2005 Mouhanna et al. ......... 709/223

FOREIGN PATENT DOCUMENTS

JP        2004-303025        10/2004

* cited by examiner

Primary Examiner—Hong Kim
(74) Attorney, Agent, or Firm—Mattingly, Stanger, Malur & Brundidge, PC

(57) ABSTRACT

It is an object of the present invention to use the resources of various sites in an effective manner. The first site has a first DB access part in use. The second site has a second DB access part in use in addition to a first DB access part for standby corresponding to the first DB access part in use. The second DB access part in use writes data into a second storage device that is assigned to the second DB access part itself. The inter-site monitoring server monitors the first DB access part in use and the second DB access part, and in cases where it is detected that the first DB access part in use has gone down, the inter-site monitoring server switches the first DB access part for standby to the DB access part in use.

9 Claims, 22 Drawing Sheets

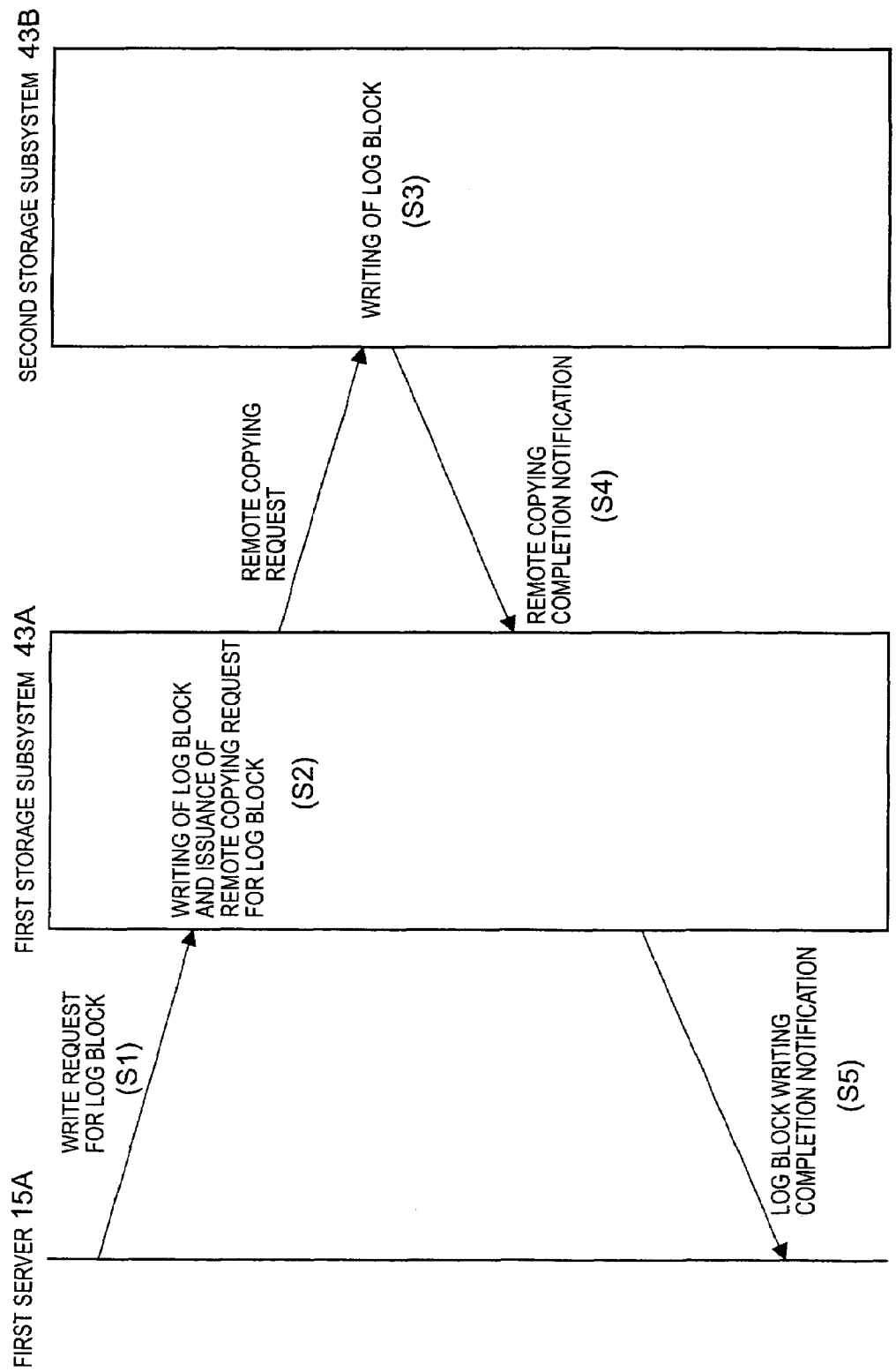

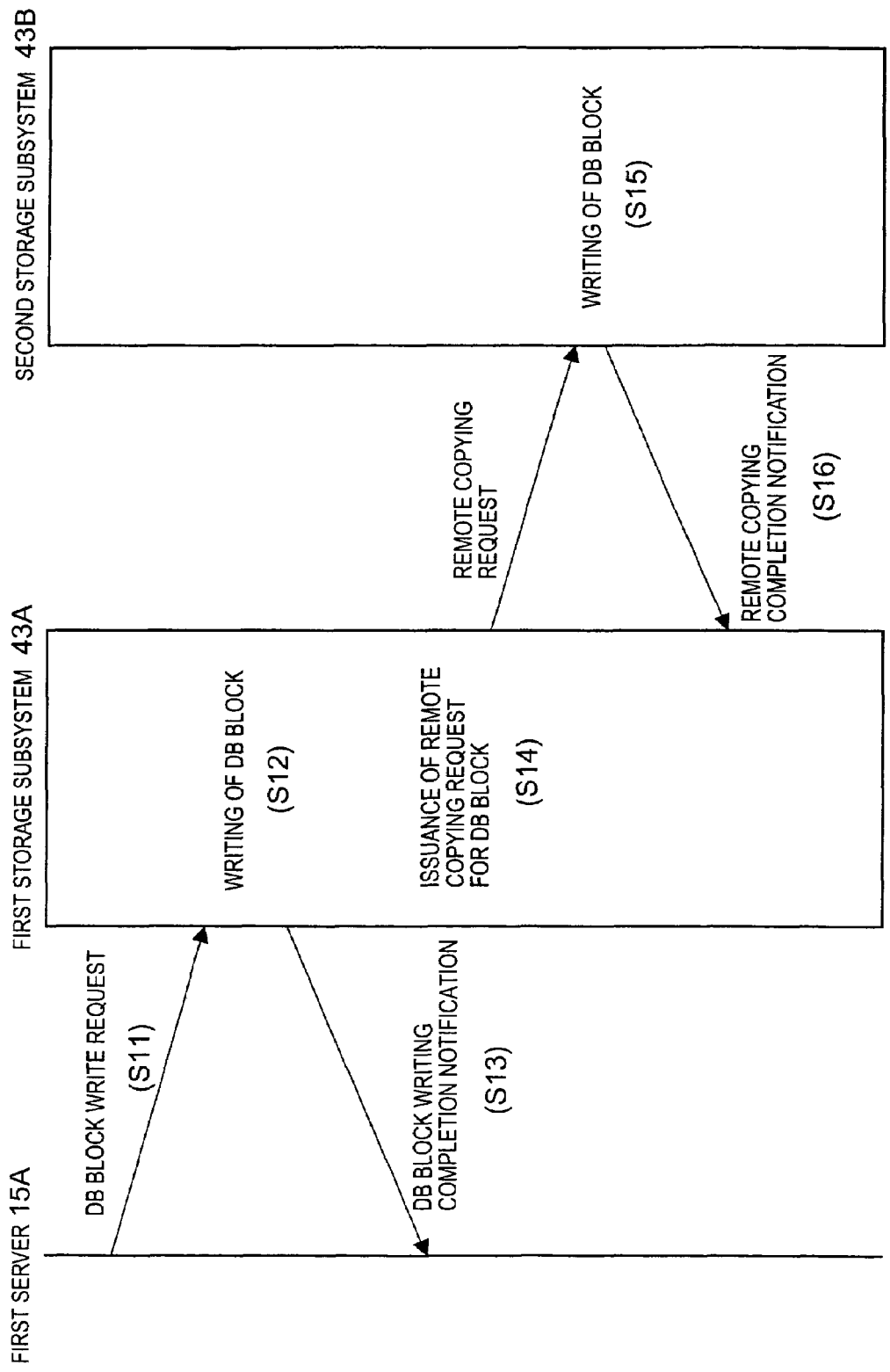

FIG. 5A

DB-VOL MAPPING TABLE 67A

| DATA BASE REGION ID | FILE ID | TYPE | SUBSERVER ID | PRIMARY STORAGE SUBSYSTEM ID | PRIMARY VOL ID (LUN) | SECONDARY STORAGE SUBSYSTEM ID | SECONDARY VOL ID (LUN) |
|---|---|---|---|---|---|---|---|
| DBAREA 1 | FILE 11 | DB | DB ACCESS PART 1A-1 | CTL # A1 | VOL 11-A | CTL # B1 | VOL 11-B |
| DBAREA 2 | FILE 21 | DB | DB ACCESS PART 3B-1 | CTL # B1 | VOL 12-B | CTL # A1 | VOL 12-A |
| LOG 1 | FILE 31 | LOG | DB ACCESS PART 1A-1 | CTL # A2 | VOL 21-A | CTL # B2 | VOL 21-B |
| LOG 2 | FILE 41 | LOG | DB ACCESS PART 1A-1 | CTL # A2 | VOL 22-A | CTL # B2 | VOL 22-B |
| LOG 3 | FILE 51 | LOG | DB ACCESS PART 3B-1 | CTL # B1 | VOL 23-B | CTL # A2 | VOL 23-A |
| ... | | | | | | | |

FIG. 5B

REMOTE COPY MANAGEMENT TABLE 87A

| COPYING MODE / PAIR STATE | PRIMARY SITE ID | PRIMARY STORAGE SUBSYSTEM ID | PRIMARY VOL ID (LUN) | SECONDARY SITE ID | SECONDARY STORAGE SUBSYSTEM ID | SECONDARY VOL ID (LUN) |
|---|---|---|---|---|---|---|
| ASYNCHRONOUS / PAIR | SITE A | CTL # A1 | VOL 11-A | SITE B | CTL # B1 | VOL 11-B |
| ASYNCHRONOUS / REVERSED | SITE B | CTL # A1 | VOL 12-A | SITE A | CTL # B1 | VOL 12-B |
| SYNCHRONOUS / PAIR | SITE A | CTL # A2 | VOL 21-A | SITE B | CTL # B2 | VOL 21-B |
| SYNCHRONOUS / PAIR | SITE A | CTL # A2 | VOL 22-A | SITE B | CTL # B2 | VOL 22-B |
| SYNCHRONOUS / PAIR | SITE B | CTL # A2 | VOL 23-A | SITE A | CTL # B2 | VOL 23-B |
| ... | | | | | | |

FIG. 6A

MONITORING RESULT TABLE 103

| SITE ID | STATE |
|---|---|
| SITE A | NORMAL |
| SITE B | NORMAL |

SERVER STATE TABLE 104

| SITE ID | SERVER TO BE MONITORED | RESPONSE WAITING TIME LENGTH | STATE |
|---|---|---|---|
| SITE A | SERVER A1 | 1 SECOND | NORMAL |
| ... | | | |

WAITING TIME THRESHOLD

DB ACCESS PART CONTROL TABLE 101

| SUBSERVER ID | SITE ID | CURRENT USE /STANDBY | STATE | ID OF SERVER CURRENTLY IN USE | STANDBY SERVER ID | SECONDARY SIDE SERVER ID | SECONDARY SIDE STANDBY SERVER ID |
|---|---|---|---|---|---|---|---|
| DB ACCESS PART 1A-1 | SITE A | CURRENTLY IN USE | NORMAL | SERVER A1 | SERVER A2 (DB ACCESS PART 2A-1) | SERVER B1 (DB ACCESS PART 3A-1) | SERVER B2 (DB ACCESS PART 4A-1) |
| DB ACCESS PART 1A-2 | SITE A | CURRENTLY IN USE | NORMAL | SERVER A1 | SERVER A2 (DB ACCESS PART 2A-2) | SERVER B1 (DB ACCESS PART 3A-2) | SERVER B2 (DB ACCESS PART 4A-2) |
| ... | | | | | | | |

27

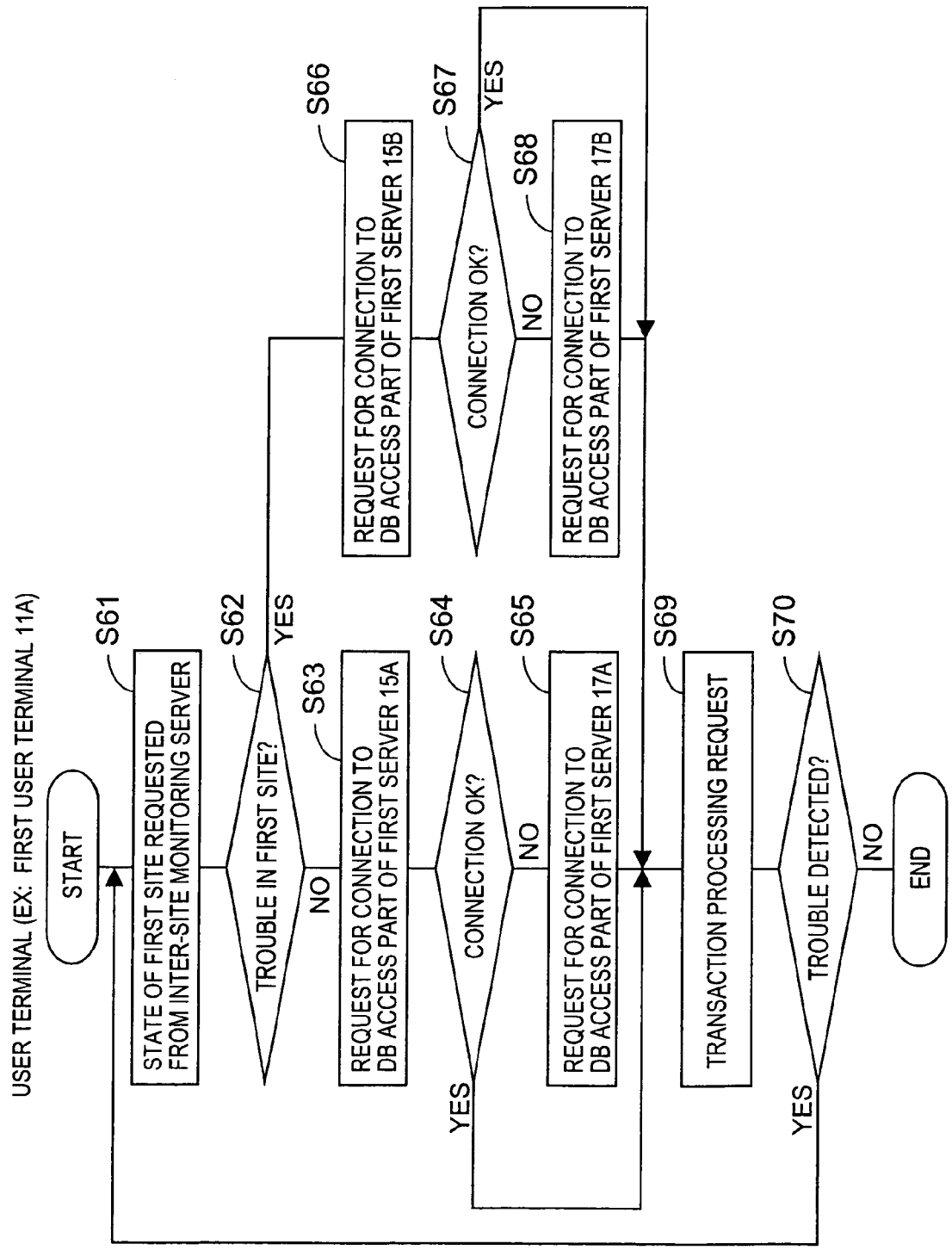

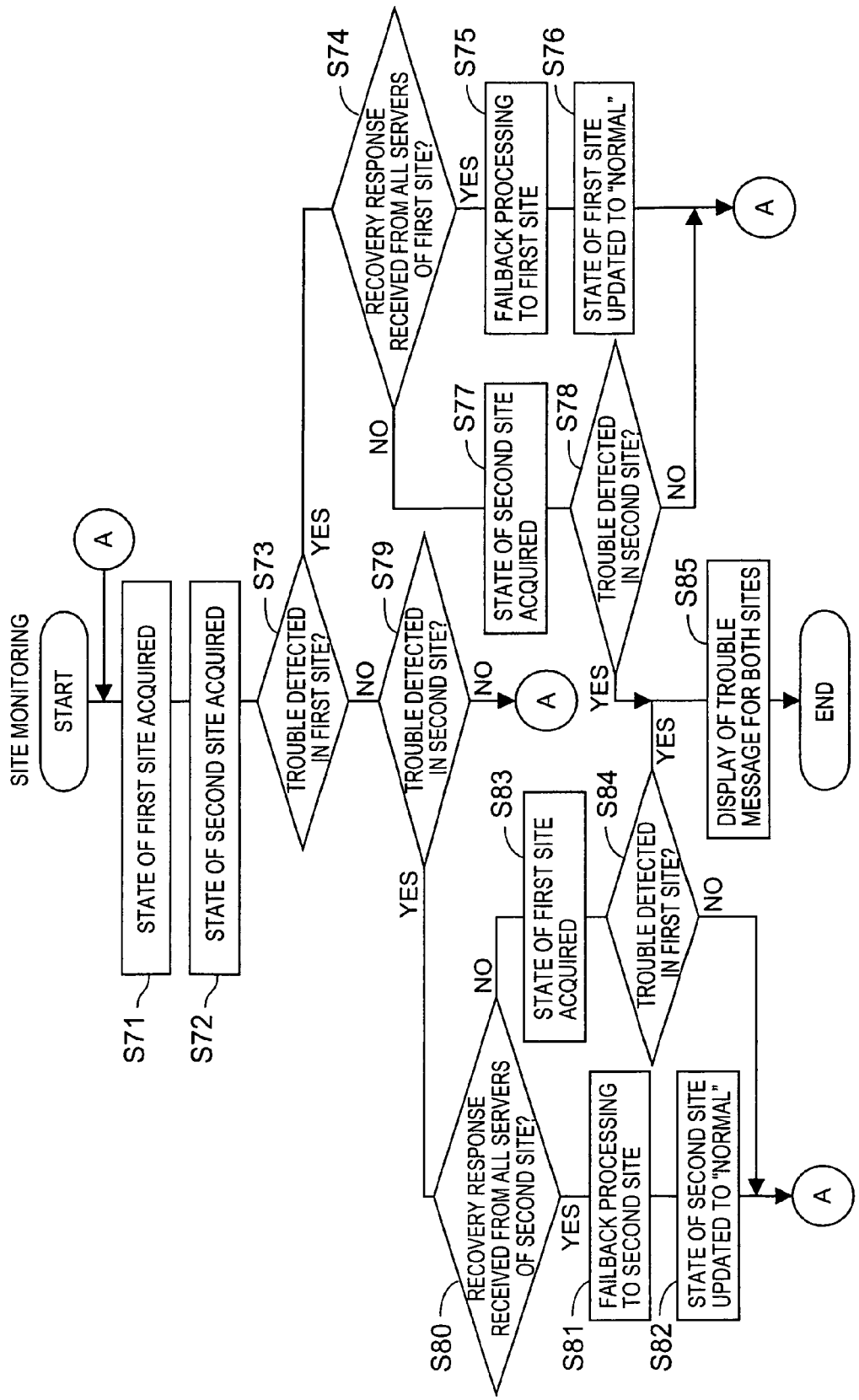

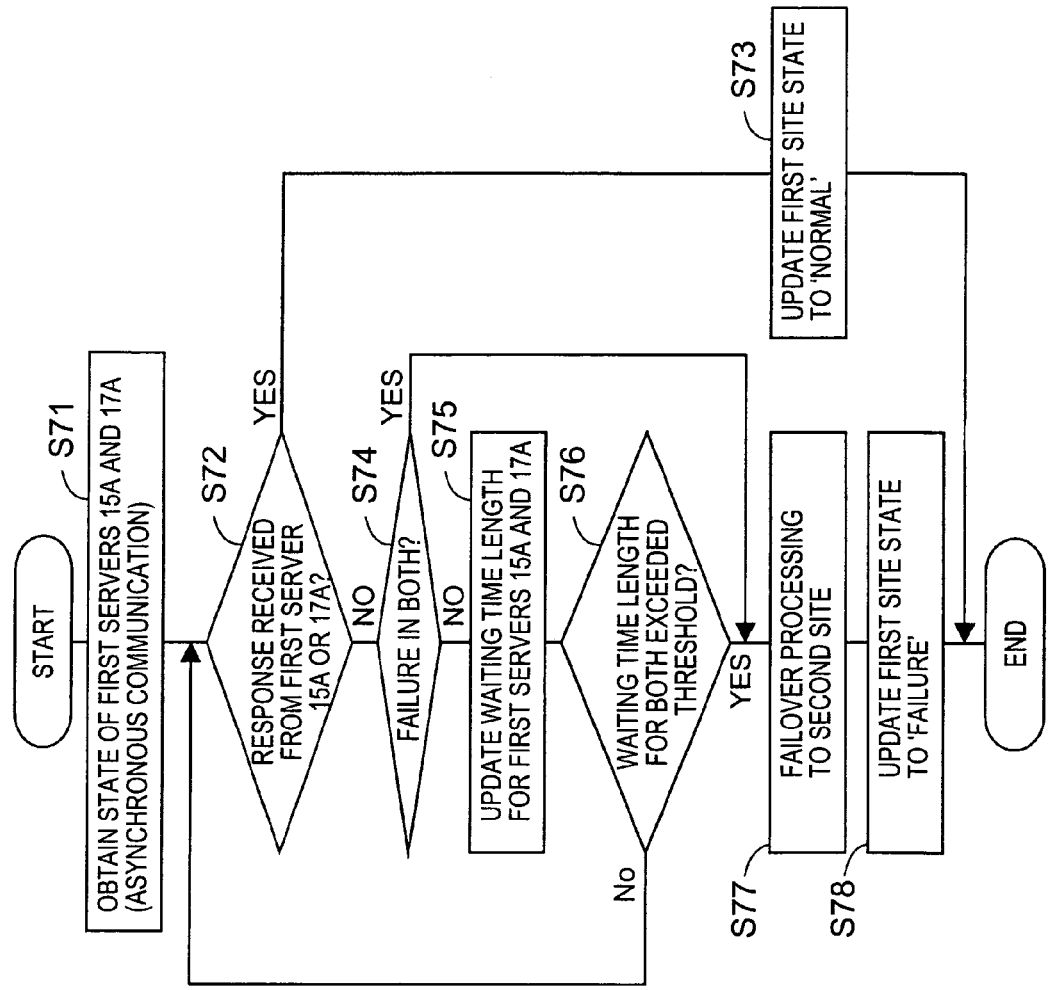

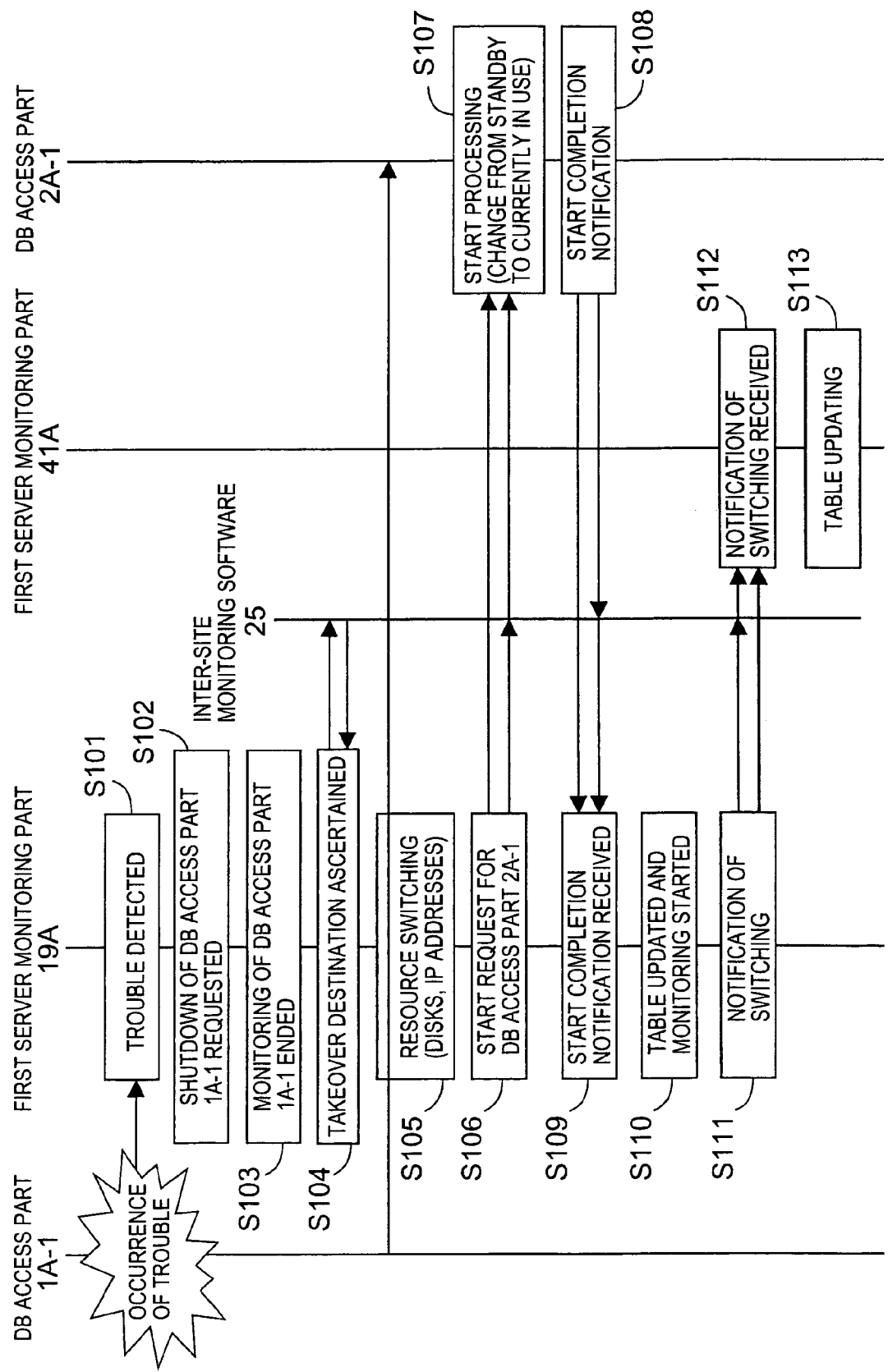

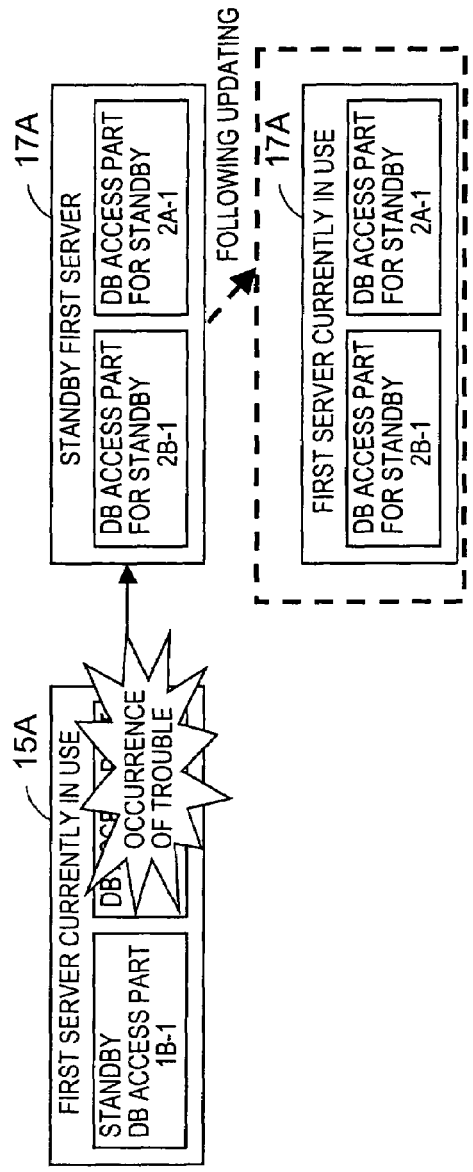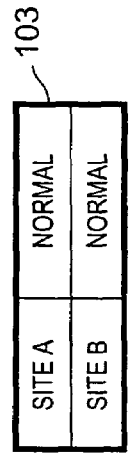

FIG. 14

DB-VOL MAPPING TABLE 67A

| DATA BASE REGION ID | FILE ID | TYPE | SUBSERVER ID | PRIMARY STORAGE SUBSYSTEM ID | PRIMARY VOL ID (LUN) | SECONDARY STORAGE SUBSYSTEM ID | SECONDARY VOL ID (LUN) |
|---|---|---|---|---|---|---|---|
| DBAREA 1 | FILE 11 | DB | (DB ACCESS PART 2A-1) | CTL # A1 | VOL 11-A | CTL # B1 | VOL 11-B |
| DBAREA 2 | FILE 21 | DB | DB ACCESS PART 3B-1 | CTL # B1 | VOL 12-B | CTL # A1 | VOL 12-A |
| LOG 1 | FILE 31 | LOG | (DB ACCESS PART 2A-1) | CTL # A2 | VOL 21-A | CTL # B2 | VOL 21-B |
| LOG 2 | FILE 41 | LOG | (DB ACCESS PART 2A-1) | CTL # A2 | VOL 22-A | CTL # B2 | VOL 22-B |
| LOG 3 | FILE 51 | LOG | DB ACCESS PART 3B-1 | CTL # B2 | VOL 23-B | CTL # A2 | VOL 23-A |
| ... | | | | | | | |

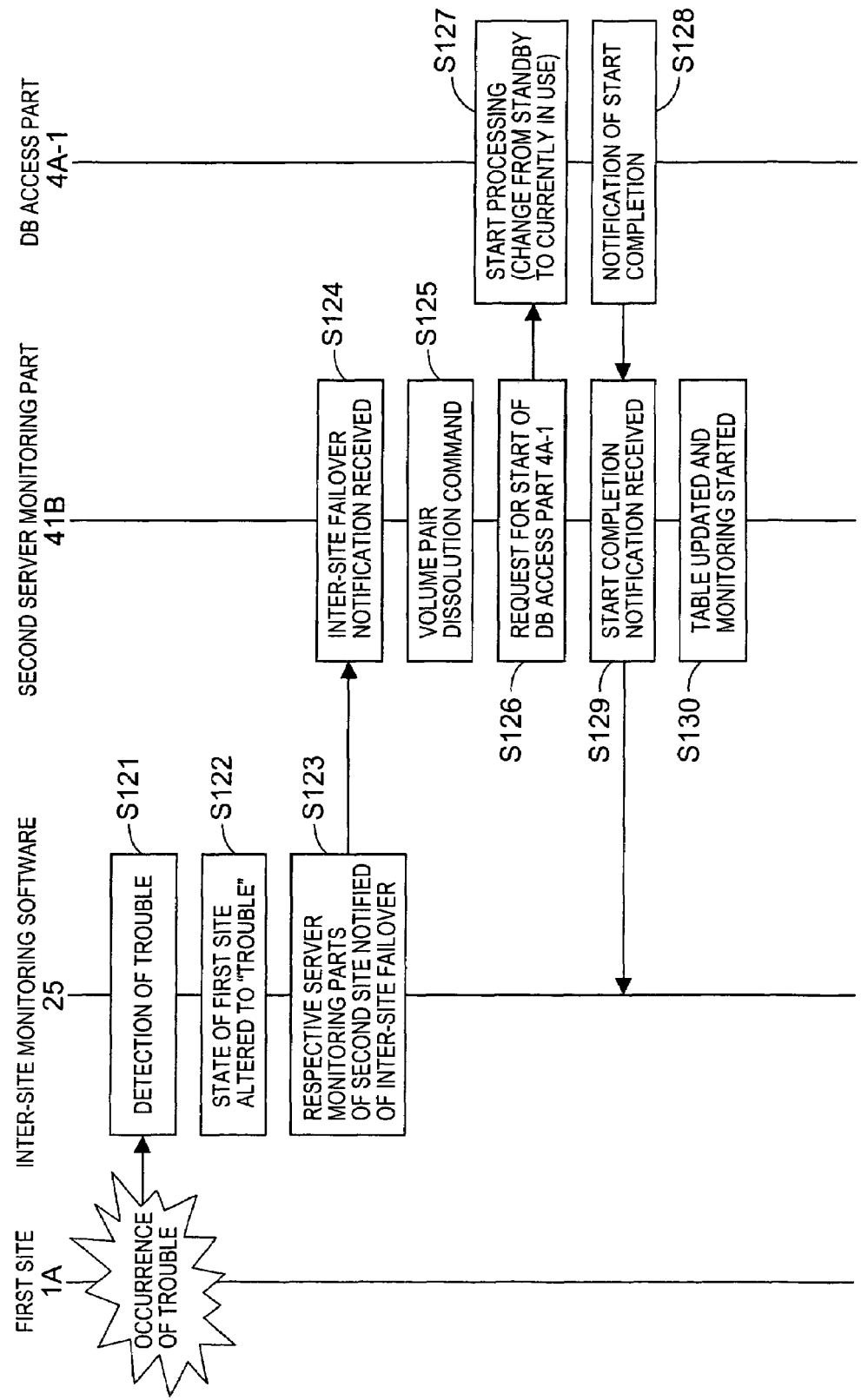

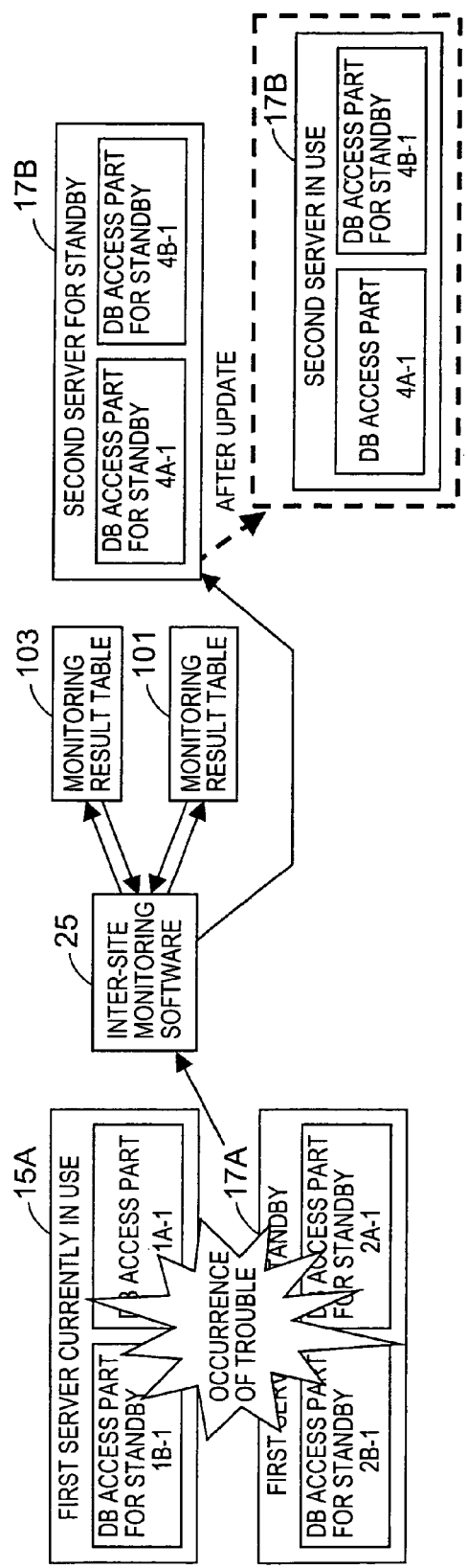

FIG. 17A

DB-VOL MAPPING TABLE 67A

| DATA BASE REGION ID | FILE ID | TYPE | SUBSERVER ID | PRIMARY STORAGE SUBSYSTEM ID | PRIMARY VOL ID (LUN) | SECONDARY STORAGE SUBSYSTEM ID | SECONDARY VOL ID (LUN) |
|---|---|---|---|---|---|---|---|
| DBAREA 1 | FILE 11 | DB | DB ACCESS PART 4A-1 | CTL # A1 | VOL 11-A | CTL # B1 | VOL 11-B |
| DBAREA 2 | FILE 21 | DB | DB ACCESS PART 4B-1 | CTL # B1 | VOL 12-B | CTL # A1 | VOL 12-A |
|  | FILE 31 | LOG | DB ACCESS PART 4A-1 | CTL # A2 | VOL 21-A | CTL # B2 | VOL 21-B |
| LOG 1 | FILE 41 | LOG | DB ACCESS PART 4A-1 | CTL # A2 | VOL 22-A | CTL # B2 | VOL 22-B |
| LOG 2 | FILE 51 | LOG | DB ACCESS PART 3B-1 | CTL # B2 | VOL 23-B | CTL # A2 | VOL 23-A |
| LOG 3 |  |  |  |  |  |  |  |

FIG. 17B

REMOTE COPY MANAGEMENT TABLE 87A

| COPYING MODE / PAIR STATE | PRIMARY SITE ID | PRIMARY STORAGE SUBSYSTEM ID | PRIMARY VOL ID (LUN) | SECONDARY SITE ID | SECONDARY STORAGE SUBSYSTEM ID | SECONDARY VOL ID (LUN) |
|---|---|---|---|---|---|---|
| ASYNCHRONOUS / DISSOLVED | SITE B | CTL # A1 | VOL 11-A | — | CTL # B1 | VOL 11-B |
| ASYNCHRONOUS / DISSOLVED | SITE B | CTL # A1 | VOL 12-A | — | CTL # B1 | VOL 12-B |
| SYNCHRONOUS / DISSOLVED | SITE B | CTL # A2 | VOL 21-A | — | CTL # B2 | VOL 21-B |
| SYNCHRONOUS / DISSOLVED | SITE B | CTL # A2 | VOL 22-A | — | CTL # B2 | VOL 22-B |
| SYNCHRONOUS / DISSOLVED | SITE B | CTL # A2 | VOL 23-A |  | CTL # B2 | VOL 23-B |

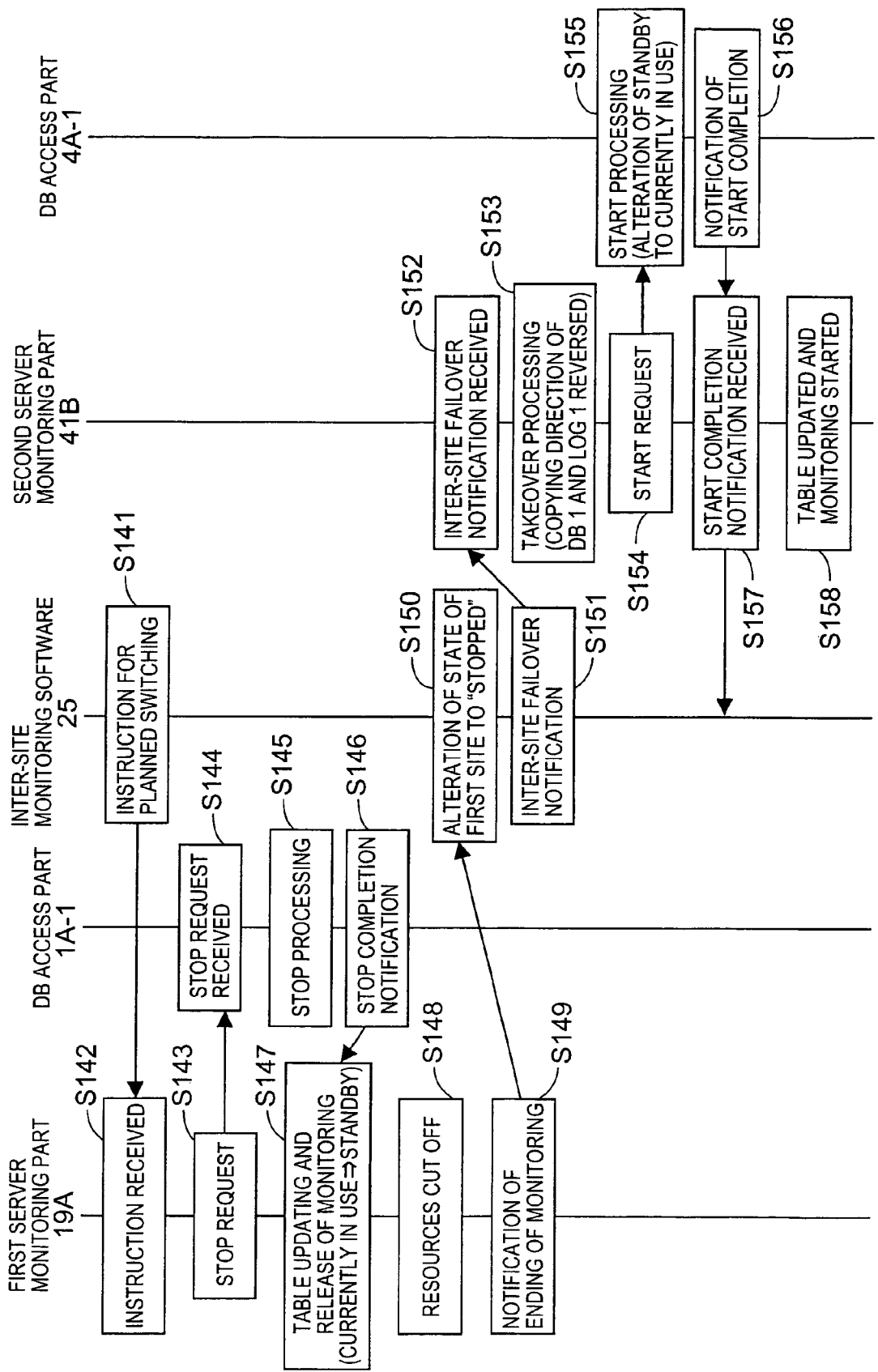

FIG. 20

VOL PAIR CONTROL TABLE 68

| PAIR STATE | PRIMARY VOL ID (LUN) | SECONDARY VOL ID (LUN) |
|---|---|---|
| PAIR | VOL 11-A | VOL 11-B |
| DISSOLVED | VOL 12-B | VOL 12-A |
| PAIR | VOL 21-A | VOL 21-B |
| PAIR | VOL 22-A | VOL 22-B |
| REVERSED | VOL 23-B | VOL 23-A |

DUAL BATCH PROCESSING (EX: RECOVERY IN THE CASE OF A CUTTING OF COMMUNICATIONS BETWEEN THE FIRST SERVER 15A AND THE FIRST STORAGE SUBSYSTEM 43A)

METHOD AND DEVICE FOR SWITCHING DATABASE ACCESS PART FROM FOR-STANDBY TO CURRENTLY IN USE

CROSS-REFERENCE TO PRIOR APPLICATION

This application relates to and claims priority from Japanese Patent Application No. 2004-357397, filed on Dec. 9th, 2004, the entire disclosure of which is incorporated herein by reference.

BACKGROUND OF THE INVENTION

1. Field of the Invention

The present invention relates to a data processing technique, and relates (for example) to a data processing technique that is used to shift processing to a second site in cases where trouble occurs in a first site.

2. Description of the Related Art

For example, one type of data processing technique is trouble recovery processing. Disaster recovery techniques are known as one type of trouble recovery processing. For instance, the technique disclosed in Japanese Patent Application Laid-Open No. 2004-303025 is known as a system that can perform disaster recovery.

Generally, in disaster recovery systems, a first site (in other words, a data processing subsystem) is constructed in a certain location (e.g., New York), a second site which has the same construction as the first site is constructed in a remote location (e.g., California) that is different from the location where the first site is present, and replication is performed between the two sites. In cases where the first site is the system in use, and the second site is a standby system, if trouble should occur (for example) in the first site, the first site is shut down, and the second site is started instead.

SUMMARY OF THE INVENTION

However, in the abovementioned system, the second site is in a standby state until trouble occurs in the first site, and therefore cannot be used effectively.

Accordingly, it is one object of the present invention to utilize the resources of respective sites in an effective manner. It is another object of the present invention to realize recovery between sites.

Other objects of the present invention will become clear from the following description.

For example, a first site comprises a first DB access part in use, a primary first storage device that is assigned to the abovementioned first DB access part in use, and a secondary second storage device that forms a pair with a primary second storage device. A second site comprises a second DB access part in use, a first DB access part for standby that corresponds to the abovementioned first DB access part in use, the abovementioned primary second storage device that is assigned to the abovementioned second DB access part in use, and a secondary first storage device that forms a pair with the abovementioned primary first storage device, and that is assigned to the abovementioned DB access part for standby. Furthermore, an inter-site monitoring server is provided. The inter-site monitoring server can monitor a first object of monitoring that is at least one of the abovementioned first DB access part in use, a first server comprising the abovementioned first DB access part in use, and the abovementioned first site, and a second object of monitoring that is at least one of the abovementioned second DB access part in use, a second server comprising the abovementioned second DB access part in use, and the abovementioned second site. In this case, a data processing method according to a first aspect of the present invention comprises the steps of the abovementioned first DB access part in use writing data into the abovementioned primary first storage device;

copying the data that is written into the abovementioned primary first storage device into the abovementioned secondary first storage device;

the abovementioned second DB access part in use writing data into the abovementioned primary second storage device;

copying the data that is written into the abovementioned primary second storage device into the abovementioned secondary second storage device;

the abovementioned inter-site monitoring server detecting that the abovementioned first DB access part in use has gone down; and the abovementioned inter-site monitoring server switching the abovementioned first DB access part for standby to the abovementioned first DB access part in use after detecting that the abovementioned first DB access part in use has gone down.

In this case, for example, when the first DB access part in use receives an access request from a user terminal or the like (following the abovementioned switching), the first DB access part can access the abovementioned secondary first storage device that is assigned to this first DB access part.

Furthermore, the first DB access part for standby may be in either a standby state or a state which is not a standby state, but in which there has been no read-out from the disk. In the former case, for example, the first DB access part for standby can be switched to the first DB access part in use by the transfer of resource information (e.g., IP addresses and the like) of the first DB access part in use (prior to the point in time where this part goes down) to the first DB access part that is for standby. On the other hand, in the latter case, for example, the first DB access part for standby can be switched to the first DB access part in use by the outputting of a start command to the first DB access part for standby by the inter-site monitoring server, so that the first DB access part for standby is started, and the subsequent transfer of the abovementioned resource information to the first DB access part for standby.

The following aspect is conceivable as one concrete embodiment.

For example, at least one first server and a first storage subsystem that is connected to the abovementioned first server are located in a first site. Furthermore, at least one second server and a second storage subsystem that is connected to the abovementioned second server are located in a second site. The abovementioned first server has at least a first DB access part in use. The abovementioned second server has at least a second DB access part in use, and a first DB access part for standby that corresponds to the abovementioned first DB access part in use. The abovementioned first storage subsystem has a primary first storage device that is assigned to the abovementioned first DB access part in use, and a secondary second storage device that forms a pair with a primary second storage device. The abovementioned second storage subsystem is connected to the abovementioned first storage subsystem, and has the abovementioned primary second storage device that is assigned to the abovementioned second DB access part in use, and a secondary first storage device that forms a pair with the abovementioned primary first storage device.

In this case, the data processing method of the present embodiment comprises the steps of:

the abovementioned first DB access part in use writing first processing result data based on the results of transaction processing into the abovementioned primary first storage device;

copying the abovementioned first processing result data written into the abovementioned primary first storage device into the abovementioned secondary first storage device of the abovementioned second storage subsystem from the abovementioned primary first storage device;

the abovementioned second DB access part in use writing second processing result data based on the results of transaction processing into the abovementioned primary second storage device;

copying the abovementioned second processing result data written into the abovementioned primary second storage device into the abovementioned secondary second storage device of the abovementioned first storage subsystem from the abovementioned primary second storage device;

detecting that the abovementioned first DB access part in use has gone down;

outputting a start command to the abovementioned first DB access part for standby corresponding to the abovementioned first DB access part in use after it has been detected that the abovementioned first DB access part has gone down;

starting the abovementioned first DB access part for standby in response to the abovementioned start command;

switching the abovementioned started first DB access part for standby to the abovementioned first DB access part in use; and the abovementioned first DB access part currently in use (following switching) writing processing result data based on the results of transaction processing into the abovementioned secondary first storage device.

In a first embodiment of this data processing method, the abovementioned first site may have another first DB access part for standby that corresponds to the abovementioned first DB access part in use. In this case, the data processing method may comprise a step in which the abovementioned the abovementioned inter-site monitoring server switches the abovementioned other first DB access part for standby to the abovementioned first DB access part in use after detecting that the abovementioned first DB access part in use has gone down.

In a second embodiment of this data processing method, the data processing method may comprise the steps of:

The abovementioned inter-site monitoring server storing DB access part relationship information constituting information that represents the correspondence relationship between respective DB access parts and other respective DB access parts in a specified storage region; and the abovementioned inter-site monitoring server specifying the DB access part for standby corresponding to the DB access part currently in use that has gone down by referring to the DB access part relationship information stored in the abovementioned specified storage region. In this case, the abovementioned specified DB access part for standby may be switched to the DB access part in use in the abovementioned switching step.

In a third embodiment of this data processing method, the data processing method may comprise the steps of:

the abovementioned inter-site monitoring server registering monitoring result information which indicates whether or not the abovementioned first object of monitoring and second object of monitoring are normal;

the abovementioned inter-site monitoring server updating the abovementioned monitoring result information in accordance with monitoring results for the abovementioned first object of monitoring and the abovementioned second object of monitoring;

the abovementioned inter-site monitoring server receiving inquiries as to whether or not the abovementioned first object of monitoring is accessible from a client terminal issuing an access request for the abovementioned first object of monitoring;

the abovementioned inter-site monitoring server judging whether or not the abovementioned client terminal can access the abovementioned first object of monitoring by referring to the monitoring result information that is registered in the abovementioned specified storage region;

the abovementioned inter-site monitoring server transmitting the result of the abovementioned judgment to the abovementioned client terminal; and the abovementioned client terminal sending an access request to the abovementioned first object of monitoring if the result of the abovementioned judgment is a judgment result of "accessible".

Furthermore, in this embodiment, for example, the data processing method may further comprise the steps of:

Monitoring the respective states of a plurality of first access parts in the abovementioned first site;

the abovementioned first site receiving access requests from the abovementioned client terminal;

specifying a first DB access part currently in use that is normal from the abovementioned monitoring results in response to the abovementioned access requests; and allowing the abovementioned specified first DB access part in use to be accessed by the abovementioned client terminal.

In a fourth embodiment of this data processing method, the abovementioned first site may have a plurality of first access parts in use, and a plurality of primary first storage devices. The abovementioned second site may have a plurality of first DB access parts for standby, and a plurality secondary first storage devices that respectively correspond to the abovementioned plurality of primary first storage devices. The first DB access parts in use and the DB access parts that are used for standby may be set in a one-to-one correspondence. Furthermore, the first DB access parts in use and the primary first storage devices may also be set in a one-to-one correspondence. Furthermore, for example, at least one of these correspondence relationships may be recorded in the abovementioned DB access part relationship information.

In a fifth embodiment of this data processing method, the abovementioned second site may have an additional secondary first storage device that forms a pair with the abovementioned secondary first storage device. The abovementioned first site may have an additional secondary second storage device that forms a pair with the abovementioned secondary second storage device. In this case, the data processing method may comprise the steps of:

copying first data stored in the abovementioned secondary first storage device into the abovementioned additional secondary first storage device in the abovementioned second site;

copying second data stored in the abovementioned secondary second storage device into the abovementioned additional secondary second storage device in the abovementioned first site;

dissolving the pair of the abovementioned secondary first storage device and the abovementioned additional secondary first storage device in the abovementioned second site;

dissolving the pair of the abovementioned secondary first storage device and the abovementioned additional secondary first storage device in the abovementioned first site;

the abovementioned first DB access part in use writing new first data into both the abovementioned primary first storage device and the abovementioned additional secondary second storage device;

the abovementioned second DB access part in use writing new second data into both the abovementioned primary second storage device and the abovementioned additional secondary first storage device;

forming a pair consisting of the abovementioned secondary first storage device and the abovementioned additional secondary first storage device in the abovementioned second site in cases where recovery from trouble is effected following the occurrence of such trouble in the abovementioned first object of monitoring;

forming a pair consisting of the abovementioned secondary first storage device and the abovementioned additional secondary first storage device in the abovementioned first site;

copying the abovementioned new second data stored in the abovementioned additional secondary first storage device into the abovementioned secondary first storage device in the abovementioned second site;

storing the abovementioned new second data written into the abovementioned secondary first storage device in the abovementioned primary first storage device of the abovementioned first site;

copying the abovementioned new second data stored in the abovementioned primary second storage device into the abovementioned secondary second storage device; and copying the abovementioned new second data copied into the abovementioned secondary second storage device into the abovementioned additional secondary second storage device in the abovementioned first site.

In a sixth embodiment of this data processing method, the abovementioned first site may further comprise a second DB access part for standby that corresponds to the abovementioned second DB access part in use. In this case, the data processing method may comprise the steps of:

The abovementioned inter-site monitoring server detecting that the abovementioned second DB access part in use has gone down; and the abovementioned inter-site monitoring server switching the abovementioned second DB access part for standby to the abovementioned second DB access part in use after detecting that the abovementioned second DB access part in use has gone down.

For example, a first DB access part in use, a primary first storage device that is assigned to the abovementioned first DB access part in use, a second DB access part for standby that corresponds to a second DB access part in use, and a secondary second storage device that forms a pair with a primary second storage device, are disposed in a first site. The abovementioned second DB access part in use, a first DB access part for standby that corresponds to the abovementioned first DB access part in use, the abovementioned primary second storage device that is assigned to the abovementioned second DB access part in use, and a secondary first storage device that forms a pair with the abovementioned primary first storage device, and that is assigned to the abovementioned DB access part for standby, are disposed in a second site. The abovementioned first DB access part in use writes data into the abovementioned primary first storage device, and the data that is written into the abovementioned primary first storage device is copied into the abovementioned secondary first storage device. The abovementioned second DB access part in use writes data into the abovementioned primary second storage device, and the data that is written into the abovementioned primary second storage device is copied into secondary second storage device. In this case, the server according to a second aspect of the present invention has a storage region that stores at least one computer program, and a processor that reads in and operates the abovementioned one or more computer programs from the abovementioned storage region. The processor that reads in the computer program monitors a first object of monitoring that is at least one of the abovementioned first DB access part in use, a first server comprising the abovementioned first DB access part in use, and the abovementioned first site, and a second object of monitoring that is at least one of the abovementioned second DB access part in use, a second server comprising the abovementioned second DB access part in use, and the abovementioned second site, and in cases where it is detected by the abovementioned monitoring that the abovementioned first DB access part in use has gone down, the abovementioned processor can switch the abovementioned first DB access part for standby to the abovementioned first DB access part in use, while in cases where it is detected by the abovementioned monitoring that the abovementioned second DB access part in use has gone down, the abovementioned processor can switch the abovementioned second DB access part for standby to the abovementioned second DB access part in use.

In the present invention, the resources of the respective sites can be utilized in an effective manner.

BRIEF DESCRIPTION OF THE DRAWINGS

FIG. 3 shows one example of the flow of synchronous remote copying processing;

FIG. 4 shows one example of the flow of asynchronous remote copying processing;

FIG. 5A shows an example of the construction of the DB-VOL mapping table;

FIG. 5B shows an example of the construction of the remote copying control table;

FIG. 6A shows an example of the information that is controlled by the inter-site monitoring server 49;

FIG. 6B shows an example of the of the construction of the DB access part control table;

FIG. 9 shows one example of the flow of the processing that is performed by the first user terminal 11A;

FIG. 10 shows one example of the flow of the processing that is performed by the inter-site monitoring software;

FIG. 11 shows one example of the flow of the monitoring processing that is performed on the servers by the inter-site monitoring software;

FIG. 12 shows one example of the flow of the intra-site failover processing that is performed when the DB access part 1A-1 of the first server in use has gone down;

FIG. 13A is an explanatory diagram of the intra-site failover processing shown in FIG. 12;

FIG. 13B shows the monitoring result table 103 in the flow of the intra-site failover processing shown in FIG. 12;

FIG. 13C shows the updating results for a certain record of the DB access part control table 101 in the flow of the intra-site failover processing shown in FIG. 12;

FIG. 13D shows the updating results for another record of the DB access part control table 101 in the flow of the intra-site failover processing shown in FIG. 12;

FIG. 14 shows the updating results for the DB-VOL mapping table 67A in the flow of the intra-site failover processing shown in FIG. 12;

FIG. 15 shows one example of the flow of the inter-site failover processing that is performed in cases where the first site 1A has gone down;

FIG. 16A is an explanatory diagram of the inter-site failover processing shown in FIG. 15;

FIG. 16B shows the updating results for the monitoring result table 103 in the flow of the inter-site failover processing shown in FIG. 16A;

FIG. 16C shows the updating results for a certain record of the DB access part control table 101B in the flow of the inter-site failover processing shown in FIG. 15;

FIG. 16D shows the updating results for another record of the DB access part control table 101B in the flow of the inter-site failover processing shown in FIG. 15;

FIG. 17A shows the updating results for the DB-VOL mapping table 67B in the flow of the inter-site failover processing shown in FIG. 12;

FIG. 17B shows the updating results for the remote copying control table 87B in the flow of the inter-site failover processing shown in FIG. 12;

FIG. 18 shows one example of planned switching processing;

FIG. 20 shows an example of the construction of the volume pair control table;

DESCRIPTION OF THE PREFERRED EMBODIMENTS

An embodiment of the present invention will be described below with reference to the attached figures. Furthermore, in the following description, "data base" may be abbreviated to "DB" in some cases. Furthermore, in the following description, the term "software" refers to computer programs that are read into a processor and operated.

Figure 1:
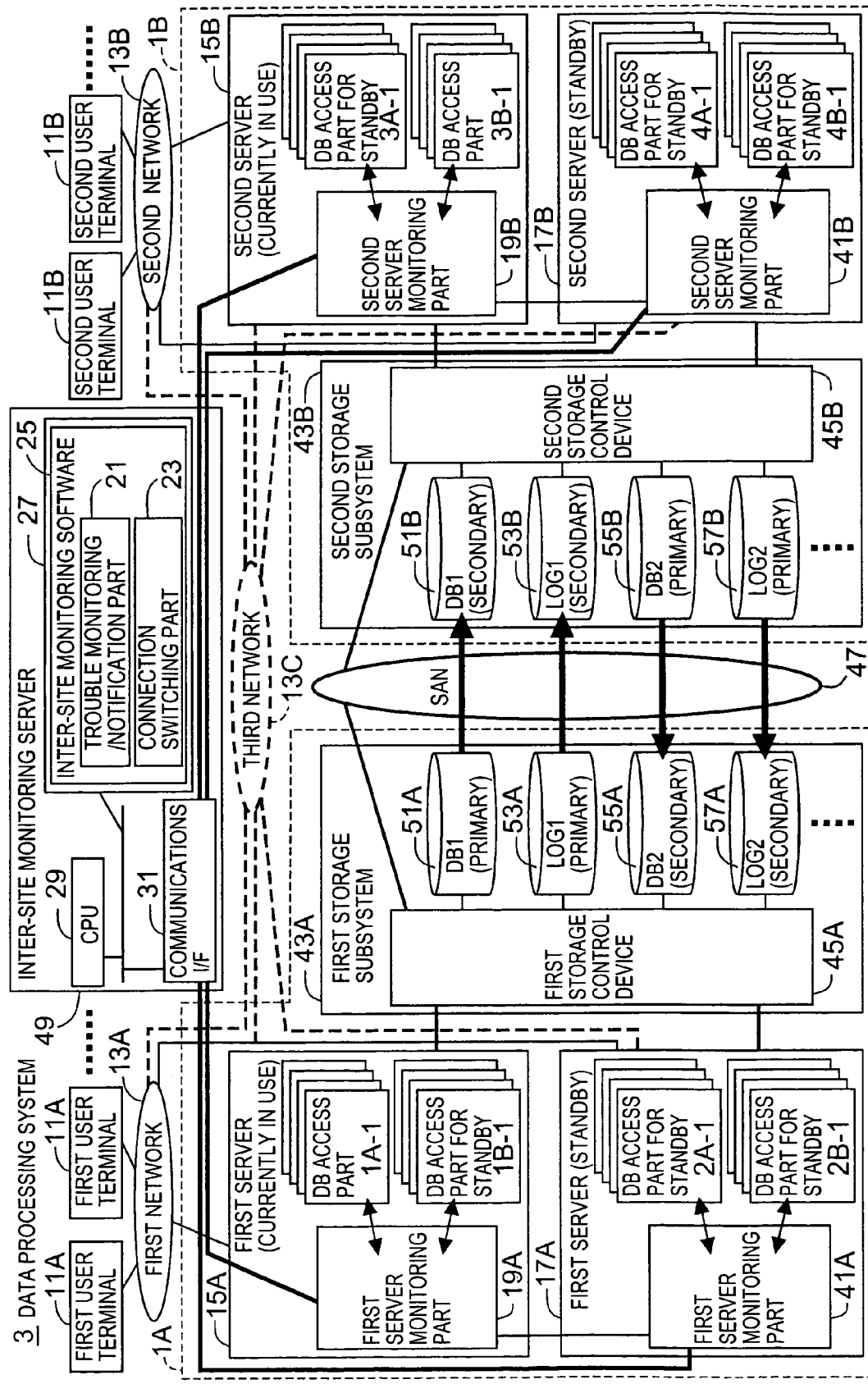
FIG. 1 shows an example of the construction of a data processing system constituting one embodiment of the present invention.

FIG. 1 shows an example of the construction of a data processing system according to one embodiment of the present invention.

For example, there are several characterizing features in the data processing system of this embodiment; an outline of these features will be described below.

The first characterizing feature is that a system in which a first site 1A and a second site 1B are respectively active is realized as a single system. Accordingly, the waste of resources in which the first site is operating while the second site is not operating at all can be prevented.

The second characterizing feature is that storage destinations can be assigned for each shop group in order to localize the effects of system trouble (e.g., machine trouble or disk trouble). In concrete terms, for example, data relating to a first processing operation (e.g., business data relating to the New York region which has branch shop A through branch shop M) can be collected in the first site 1A, and data relating to a second processing operation (e. g., business data relating to the California region which has branch shop N through branch shop X) can be collected in the second site 1B. Specifically, a construction that provides the business of shop groups can be realized. More concretely, data for respective shop groups can be stored in respective storage systems (e. g., storage systems that have an RAID (redundant array of inexpensive disk) construction) located in the respective sites 1A and 1B.

The third characterizing feature is that mutual backup of data can be realized between the first site 1A and second site 1B. For example, as will be described later, this can be realized by means of a remote copying function between storage subsystems 43A and 43B, and mutual backup between sites using DB access parts installed in the servers of the respective sites 1A and 1B.

The fourth characterizing feature is that when site switching is performed from the first site 1A to the second site 1B in cases where (for example) trouble or the like occurs in the first site, the processing of a plurality of sites can be performed using the resources of a single site 1B.

The fifth characterizing feature is that the states of the respective sites 1A and 1B are monitored by a separately installed inter-site monitoring server 49. In this case, a first user terminal 11A that can utilize the first site 1A and a second user terminal 11B that can utilize the second site 1B can be connected to the site utilized after sending an inquiring regarding the state of this site to the abovementioned server 49.

Below, the data processing system 3 of this embodiment will be described in detail.

For example, a first site 1A and a second site 1B are provided as a plurality of sites in the data processing system of this embodiment. Furthermore, an inter-site monitoring server 49 which monitors whether or not trouble has occurred in the respective sites 1A and 1B is also provided. The first site 1A and second site 1B are connected to each other via a communications network such as an SAN (storage area network) 47 or the like (or via a dedicated line). Furthermore, the first site 1A and second site 1B are also connected to the inter-site monitoring server 49 via a communications network or dedicated line.

The first site 1A and second site 1B may have substantially the same construction. In FIG. 1, the reference symbols of the constituent elements relating to the first site 1A are constructed from a parent number and a branch symbol A, and the reference symbols of the constituent elements relating to the second site 1B are constructed from a parent number and a branch symbol B. As a rule, the same parent numbers are assigned to the same constituent elements in the in the first data processing system 1A and second data processing system 1B (for convenience of description, this is not done in the case of the DB access parts described later). Below, in order to avoid redundant description, the construction of the first site 1A will be described as a typical example. It should be possible to obtain a sufficient understanding of the second site 1B by referring to this description and FIG. 1.

As at least one server, the first site 1A has (for example) the first servers 15A and 17A. Furthermore, the first site 1A comprises a first storage subsystem 43A that stores the data output from the first server 15A or 17A.

The first storage subsystem 43A comprises a plurality of logical volumes 51A, 53A, 55A and 57A that are prepared in a physical storage device (not shown in the figures), and a first storage control device 45A that controls access to this plurality of logical volumes. The first storage control device 45A is connected to the abovementioned physical storage device (not shown in the figures) and to the first servers 15A and 17A.

For example, the first server 15A is (as a rule) a server in use, and (for example), the other first server 17A is as a rule used for standby. Here, for example, the "server in use" refers mainly to a server comprising a DB access part in use (the DB access part will be described later), and the "server for standby" refers (for example) mainly to a server comprising a DB access part in use. In cases where the DB access part of the server in use goes down, this DB access part is switched from "in use" to "standby", and the DB access part for standby that corresponds to this DB access part, and that is located in the server for standby, may be switched from "standby use" to "currently in use". Nevertheless, in cases where the server in use comprises mainly a DB access part in use, this server remains "currently in use" as before; similarly, in cases where the server for standby comprises mainly a DB access part for standby, this server remains in "standby use" as before.

The first servers 15A and 17A are both connected to at least one user terminal 11A (hereafter referred to as the "first user terminal 11A") via first communications network (hereafter referred to as the "first network") 13A. Furthermore, the first servers 15A and 17A are both connected to the first storage subsystem 43A via a dedicated line, specified communications network or the like. Moreover, the first servers 15A and 17A are both connected to the inter-site monitoring server 49 via a dedicated line or the like. Furthermore, the respective servers 15A, 17A, 15B and 17B are connected to a third communications network (e. g. the internet) 13C. Moreover, the first network 13A and second network 13B are connected to the third network 13C. Accordingly, the first user terminal 11A can access DB access parts within the second site via the first network 13A and third network 13C. Similarly, the second user terminal 11B can access DB access parts within the first site via the second network 13B and third network 13C. Furthermore, the first network 13A, second network 13B and third network 13C may be separate networks, or may be the same network. The system is devised so that a plurality of servers located within the same site or a plurality of servers located in different sites can communicate with each other regardless of the construction.

The first servers 15A and 17A may have substantially the same construction. Below, the first server 15A will be described as a typical example. The first server 15A comprises a first server monitoring part 19A and a plurality of DB access parts.

The first server monitoring part 19A can be constructed by means of hardware, software or a combination of both. The first server monitoring part 19A is connected to the inter-site monitoring server 49 and the first server monitoring part 41A of the first server 17A for standby. The first server monitoring part 19A can monitor whether or not trouble has occurred in the first server 17A for standby. In concrete terms, for example, the first server monitoring part 19A can detect whether or not trouble has occurred in the first server 17A for standby according to the presence or absence of a heartbeat signal from the first server 17A for standby. Furthermore, for example, by respectively transmitting heartbeat signals to the first server 17A for standby and the inter-site monitoring server 49, the first server monitoring part 19A makes it possible to detect in the first server 17A for standby and the inter-site monitoring server 49 whether or not trouble has occurred in the first server 15A in use. Moreover, the first server monitoring part 19A can detect and control DB access part states (such as whether or not the DB access part is normal, whether or not trouble has occurred or the like) for each of the respective DB access parts within the server in which the first server monitoring part 19A is installed.

The DB access parts are constituent elements that control access to the logical volumes (hereafter indicated simply as "VOL" in some cases) provided in the storage subsystem 43. The DB access parts can be formed as computer programs that are operated by being read into a processor such as a CPU or the like; however, these DB access parts may also be realized using hardware or a combination of hardware and computer programs. At least one DB access part can be installed in one server 15 or 17.

In concrete terms, in this embodiment, DB access parts 1A-1 through 1A-4 that are (as a rule) currently in use in the first site 1A (only OO-1 is indicated in FIG. 1, same below) are installed in the first site 1A (e. g., the first server 15A in use), and DB access parts 3A-1 through 3A-4 for standby that respectively correspond to these DB access parts 1A-1 through 1A-4 are installed in the second site 1B (e. g., the second server 15B in use). Furthermore, other DB access parts 2A-1 through 2A-4 for standby that respectively correspond to the DB access parts 1A-1 through 1A-4 in use are installed in the same site 1A (e. g., the first server 17A for standby). Moreover, still other DB access parts 4A-1 through 4A-4 that respectively correspond to the DB access parts 3A-1 through 3A-4 (or 2A-1 through 2A-4) for standby are installed in the second site 1B (e.g., the second server 17B for standby). In such a construction, for example, in cases where trouble occurs in the DB access part 1A-1 in use, the DB access part 3A-1 (or 2A-1) for standby can be started, and the processing of the DB access part 1A-1 can be transferred to this DB access part. Furthermore, for example, in cases where trouble also occurs in the started DB access part 3A-1 (or 2A-1) for standby, the additional DB access part 4A-1 for standby can be started, and the processing can be transferred to this DB access part.

At least one of the plurality of logical volumes located in the data processing system 1A (e. g., the first storage subsystem 43A) can be assigned to the respective DB access parts located in the same data processing system 1A. For example, the primary DBVOL 51A and the primary log VOL 53A can be assigned to the DB access part 1A-1 in use. Furthermore, the secondary DBVOL 55A and the secondary log VOL 57A can be assigned to the DB access part 1B-1 for standby. Moreover, the primary DBVOL 51A and primary log VOL 53A can respectively form pairs with the secondary DBVOL 51B and secondary log VOL 53B in the second site 1B. Furthermore, the secondary DBVOL 55A and secondary log VOL 57A can respectively form pairs with the primary DBVOL 55B and primary log VOL 57B in the second site 1B. As a rule, the primary DBVOL 55B and primary log VOL 57B can be assigned to the DB access part 3B-1 in use in the second site 1B. In such a construction, for example, in cases where certain data is written into the primary DBVOL 51A and primary log VOL 53A by the DB access part 1A-1, this data (or the difference from the data prior to updating) is written into the secondary DBVOL 51B and secondary log VOL 53B of the second storage subsystem 43B via (for example) a network such as the SAN 47 or the like (or a dedicated line). Similarly, for example, in cases where certain data is written into the primary DBVOL 55B and primary log VOL 57B by the DB access part 3B-1, this data (or the difference from the data prior to updating) is written into the secondary DBVOL 55A and secondary log VOL 57A of the first storage subsystem 43A via (for example) a network such as the SAN 47 or the like (or a dedicated line). Such processing can be performed by the first storage control device 45A installed in the first storage subsystem 43A or the second storage control device 45B installed in the second storage subsystem 43B.

DB access parts of the first system (DB access parts in which the second number in OO-O is indicated by "A"), i. e., DB access parts relating to the first site 1A (or in other words, DB access parts for the first site) were described above; however, this description can also be applied to DB access parts of the second system (DB access parts in which the second number in OO-O is indicated by "B"), i. e., DB access parts relating to the second site 1B (or in other words, DB access parts for the second site). Furthermore, the order of the transfer of the DB access parts is not limited to the abovementioned order; some other order may also be used.

The inter-site monitoring server 49 is an information processing device comprising hardware resources such as a CPU 29, storage region 27, communications interface circuit (hereafter ordinarily referred to as an "I/F") 31 and the like. The storage region 27 is a storage region that is realized by means of at least one memory resource such as a memory or hard disk. For example, monitoring software 25 that is executed by being read into the CPU 29 is stored in the storage region 27. The inter-site monitoring software 25 includes a trouble monitoring/notification part 21, and a connection switching part 23. For example, the CPU 29 that has read in the inter-site monitoring software 25 can monitor whether or not any site has gone down, notify a specified node of the second site 1B (e. g., the second server 15B in use) of the occurrence of trouble in cases where (for example) it is detected that trouble has occurred in the first site 1A so that this site has gone down, and switch the connection destination of the first user terminal 11 connected to the first site 1A (e. g., the DB access part 1A-1) in which trouble has occurred to the second site 1B (e. g., the DB access part 3A-1 for standby). For example, by monitoring whether or not a heartbeat signal has been input via the communications I/F 31, the inter-site monitoring server 49 can detect whether or not trouble has occurred in the server 15A, 17A, 15B or 17B that is the monitoring destination. For example, in cases where the inter-site monitoring server 49 detects that both of the first servers 15A and 17A have gone down, the inter-site monitoring server 49 can judge that the first site 1A has gone down.

Figure 2:
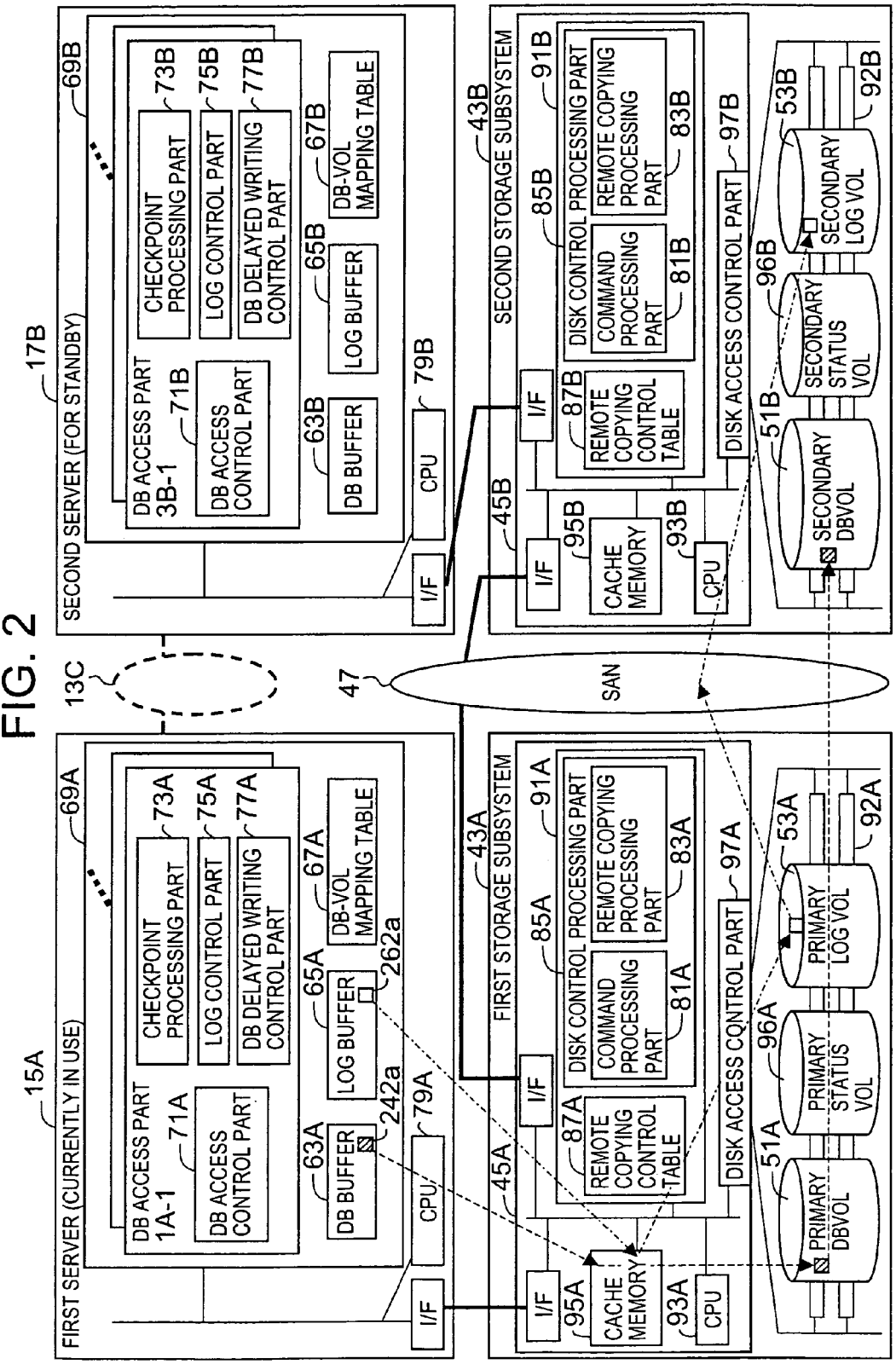
FIG. 2 shows an example of the construction of the servers and storage subsystems disposed in a data processing system constituting one embodiment of the present invention.

FIG. 2 shows an example of the construction of the servers and storage subsystem installed in a data processing system constituting one embodiment of the present invention.

In this embodiment, the first server 15A in use may be a primary host computer, and the second server 17B may be an secondary host computer with respect to this first server 15A. Furthermore, the first storage subsystem 43A may be a primary storage subsystem, and the second storage subsystem 43B may be an secondary storage subsystem with respect to this first storage subsystem 43A. The first server 15A and second server 17B (and of course the other servers 15B and 17A) may have substantially the same construction. Furthermore, the first storage subsystem 43A and second storage subsystem 43B may also have substantially the same construction. In FIG. 2, the matter of which constituent elements are located in which servers or which storage subsystems can be distinguished by assigning the same parent symbols to the same constituent elements, and varying the branch symbols. Below, the first server 15A and first storage subsystem 43A will be described as representative examples.

The first server 15A is an information processing device comprising hardware resources such as a CPU 79A, storage region 69A, I/F and the like. The storage region 69A is a storage region that is realized by means of at least one specified memory resource such as a memory or hard disk. For example, the DB access parts 1A-1 through 1A-4, the DB access parts 1B-1 through 1B-4 for standby (not shown in the figures), and a DB-VOL mapping table 67A, can be stored in the storage region 69A. Furthermore, a DB buffer 63A and a log buffer 65A can be disposed in the storage region 69A.

The DB access part 1A-1 (as well as the other DB access parts) has a DB access control part 71A, a checkpoint processing part 73A, a log control part 75A, and a DB delayed writing processing part 77A.

The DB access control part 71A receives queries from the first user terminal 11A, and executes processing. The DB access control part 71A can specify the storage subsystem in which the logical volume that is the access destination (corresponding to the query) is located by referring to the DB-VOL mapping table. In cases where it is specified that the access destination corresponding to the received query is a VOL inside the first storage subsystem 43A, the DB access control part 71A accesses the primary DBVOL 51A and/or the primary log VOL 53A via the DB buffer 63A and/or log buffer 65A. On the other hand, in cases where it is specified that the access destination corresponding to the received query is a logical volume inside the second storage subsystem 43B, the DB access control part 71A transfers the query to the second server 15B currently in use, which is connected to the second storage subsystem 43B.

In cases where the need arises to reflect the content of the DB buffer 63A in a logical volume inside the first storage subsystem 43A (e. g., in cases where the log record indicating that the records in the DB buffer 63A have reached a specified number of records), the checkpoint processing part 73A transmits a write request for specified status information (all DB blocks that have been updated in the DB buffer 63A, and status information indicating the position in the log VOL of the most recent log record at the time of this updating) to the first storage subsystem 43A. Furthermore, since there may also be instances in which transactions are not completed at the checkpoint time, there may also be cases in which the positions of old log records (e. g., the oldest log record) relating to incomplete transactions are indicated in this status information besides the positions of the most recent log records. Furthermore, there may also be cases in which the updating of status information in the VOL is delayed. In either of these cases, this status information may be utilized as information indicating the position of the log where reference is initiated when the DB access parts are restarted.

The log control part 75A can control whether or not the empty capacity of the log buffer 65A has dropped to a value that is equal to or less than a specified capacity (or the like). The log control part 75A writes log information (log block 262a) indicating the content of the data base processing that is performed with respect to the DB buffer 63A into the log buffer 65A. Furthermore, the log control part 75A transmits a write request for the log block 262a that is written into the log buffer 65A to the first storage subsystem 43A. The log control part 75A can issue this write request in cases where it is detected that specified conditions have been achieved. For example, such specified conditions may include commitment to a transaction, the passage of a specified time from the initiation of log information recording, a drop in the empty capacity of the log buffer 65A to a specified capacity or lower, or the like.

The DB delayed writing processing part 77A transmits a write request for DB data (DB block 242a) in the DB buffer 63A to the first storage subsystem 43A. The DB delayed writing processing part 77A can execute this processing in cases where it is detected that specified conditions have been achieved. Here, for example, the specified conditions may include commitment to a transaction, the passage of a specified time from the initiation of log information recording, a drop in the empty capacity of the DB buffer 63A to a specified capacity or lower, or the like.

The program that is used to cause the first server 15A to function as the abovementioned DB access control part 71A, checkpoint processing part 73A, log control part 75A and DB delayed writing processing part 77A can be loaded into memory and executed after being downloaded from a storage medium such as a CD-ROM or the like, or from a magnetic disk or the like via a communications network. Such a computer program execution system can be applied not only to the first server 15A, but also to other servers, storage subsystems or the like.

As has already been described above, the first storage subsystem 43A comprises a first storage control device 45A, and at least one physical storage device (e. g., hard disk drive) 92A that can construct logical volumes 51A, 96A and 53A. The first storage control device 45A comprises an I/F used for connection to the first servers 15A and 17A, an I/F used for connection to the SAN 47, a cache memory 95A, a storage region 91A disposed in a memory that is the same as or separate from the cache memory 95A, a CPU 93A, and a disk access control part 97A that is connected to the physical storage device 92A. For example, a disk control processing part 85A that can be operated by being read into the CPU 93A, and a remote copying control table 87A, can be stored in the storage region 91A.

The disk control processing part 85A can control the operation of the first storage subsystem 43A as a whole. For example, the disk control processing part 85A comprises a command processing part 81A and a remote copying control part 83A.

The command processing part 81A receives write requests for the DB block 242a, the abovementioned status information or the log block 262a from the first server 15A, and performs updating of the primary DBVOL 51A, primary status VOL 96A, primary log disk VOL 53A or cache memory 95A storing the data blocks stored in these volumes in accordance with the contents of these received write requests.

The remote copying control part 83A refers to the remote copying control table 87A, and performs remote copying into the secondary VOLs 51B, 96B or 53B corresponding to the primary VOLs 51A, 96A or 53A in synchronization or non-synchronization with the updating of these VOLs on the basis of the information that is written into this table 87A. In this case, furthermore, the remote copying control part 83B that is installed in the second storage subsystem 43B can receive write requests for the DB block 242a, the abovementioned status information or the log block 262a from the first storage subsystem 43A, and can perform updating of the secondary DBVOL 51B, secondary status VOL 96B or secondary log VOL 53B inside the second storage subsystem 43B, or the cache memory 95B storing the data blocks of these volumes, in accordance with the contents of these received write requests.

In this embodiment, in regard to write requests for the log block 262a, the first storage subsystem 43A performs the processing of remote copying into the second storage subsystem 43B (hereafter referred to as "synchronous remote copying processing" in some cases) in synchronization with the writing of the log block 262a; furthermore, in regard to the writing of the DB block 242a and status information, the first storage subsystem 43A performs the processing of remote copying into the second storage subsystem 43B (hereafter referred to as "asynchronous remote copying processing" in some cases) without any synchronization with the writing in the first storage subsystem 43a. This will be described below.

FIG. 3 shows one example of the flow of the synchronous remote copying processing.

For example, in cases where access to the primary DBVOL 51A is requested as a result of certain transaction processing, the DB access control part 71A issues a READ command for the primary DBVOL 51A to the first storage subsystem 43A, so that the DB block 242a is acquired from the DBVOL 51A and stored in the DB buffer 63A. Then, after performing data base processing for the DB block 242a in the DB buffer 63A, the DB access control part 71A produces a log block 262a that indicates the processing content, and stores this log block 262a in the log buffer 65A.

In cases where specified conditions (e. g., commitment to a transaction, the passage of a specified time from the initiation of log information recording, a drop in the empty capacity of the log buffer 65A to a specified capacity or lower, or the like) have been achieved, the log control part 75A produces a write request for the writing of the log block 262a as a write request that is sent to the primary log VOL 53A of the log block 262a that is stored in the log buffer 65A, and transmits the produced write request and the log block 262a to the first storage subsystem 43A (step S1).

In response to this write request, the first storage subsystem 43A writes the log block 262a received from the first server 15A into the cache memory 95A, and transmits the log block 262a in the cache memory 95A and a remote copying request for this log block 262a to the second storage subsystem 43A (S2). The issuance of a remote copying request can be performed by the remote copying processing part 83A. Furthermore, the log block 262a written into the cache memory 95A is written into the primary log VOL 53A by the disk control processing part 85A.

In response to the remote copying request from the first storage subsystem 43A, the second storage subsystem 43B writes the log block 262a from the first storage subsystem 43A into the cache memory 95B (S3), produces a remote copying completion notification which indicates that writing has been completed, and transmits the produced remote copying completion to the first storage subsystem 43A (S4). The production and issuance of this remote copying completion notification can be performed by the remote copying processing part 83B. Furthermore, the log block 262a written into the cache memory 95B is written into the secondary log VOL 53B by the disk control processing part 85B.

In cases where a remote copying completion notification is received from the second storage subsystem 43B, the first storage subsystem 43A produces a log writing completion notification which indicates that the writing of the log block 262*a* has been completed, and transmits this completion notification to the first server 15A (S5).

FIG. 4 shows one example of the flow of asynchronous remote copying processing. In the following description, a DB block is taken as an example of the object of writing; however, asynchronous remote copying processing can also be applied to status information.

For example, in cases where specified conditions are achieved (e. g., in cases where the empty capacity of the DB buffer 63A has dropped to a specified capacity or lower), the DB delayed writing processing part 77A in the first server 15A transmits the DB block 242*a* in the DB buffer 63A and a write request for the same to the first storage subsystem 43A (S11).

In cases where the first storage subsystem 43A receives a write request for the DB block 242*a*, the first storage subsystem 43A writes the DB block 242*a* from the first server 15A into the cache memory 95A (S12), produces a writing completion notification indicating that the writing of the DB block 242*a* has been completed, and transmits this notification to the first server 15A (S13). The DB block 242*a* that has been written into the cache memory 95A is written into the primary DBVOL 51A by the disk control processing part 85A.

Subsequently, the first storage subsystem 43A transmits the DB block 242*a* written into the cache memory 95A and primary DBVOL 51A, and a remote copying request for this block, to the second storage subsystem 43B (S14).

In response to the remote copying request from the first storage subsystem 43A, the second storage subsystem 43B writes the DB block 242*a* from the first storage subsystem 43A into the cache memory 95B (S15), produces a remote copying completion notification which indicates that writing has been completed, and transmits the produced remote copying completion notification to the first storage subsystem 43A (S16). The DB block 242*a* written into the cache memory 95B is written into the secondary DBVOL 51B by the disk control processing part 85B.

FIG. 5A shows an example of the construction of the DB-VOL mapping table.

For example, the data base region ID, file ID, type, subserver name, primary storage subsystem ID, primary VOL ID, secondary storage subsystem ID and secondary VOL ID are caused to correspond to each other as various information elements in each data base region in the DB-VOL mapping table 67A.

The term "data base region" refers to all or some of the storage region(s) in a certain single logical volume or plurality of logical volumes. For example, types of data base regions include DB block regions in which DB blocks are stored, and log block regions in which log blocks are stored. In the case of DB block regions, for example, "DBAREA" is indicated as the data base region ID that is used to discriminate data base regions, and the type is indicated as "DB". In the case of log block regions, for example, the data base region ID is indicated as "LOG", and the type is indicated as "log".

The file ID is an ID that is used to discriminate a single file or specified files among a plurality of files present in a data base region discriminated from the data base region ID.

The subserver ID is the ID (e. g., name) of the DB access part that accesses the associated data base region.

The primary storage subsystem ID is the ID of the storage subsystem which has the associated data base region.

The primary VOL ID is the ID (e. g., logical unit number (LUN)) of the primary VOL that has the associated data base region.

The secondary storage subsystem ID is the ID of the storage system that can form a pair with the primary storage subsystem.

The secondary VOL ID is the ID of the secondary VOL that can form a pair with the primary VOL that has the associated data base region.

Data base processing, i. e., write processing into the logical volumes, is performed in accordance with the information that is recorded in this DB-VOL mapping table 67A (one example of this processing will be described in detail later). Furthermore, the DB-VOL mapping table 67B may also have the same construction as the abovementioned mapping table 67A. For example, a DB-VOL mapping table is provided in each server as shown in the figures; however, it would also be possible to install such a table in other computers (e. g., the storage subsystems).

FIG. 5B shows an example of the construction of the remote copying control table. In FIG. 5B, the remote copying control table 87A disposed in the first storage subsystem 43A is shown as a representative example; however, the construction of the table 87A shown in the figures can also be applied to the remote copying control table 87B that is disposed in the second storage subsystem 43B.

For example, the copying mode that indicates whether the write processing is to be performed synchronously or asynchronously, the pair state, the respective IDs of the primary storage subsystem and secondary storage subsystem for which writing processing is being performed in the copying mode, and the ID of the primary VOL that is the copying destination in this copying mode, are registered in the remote copying control table 87A. Furthermore, the IDs (e. g., names) of servers (and/or DB access parts) assigned as servers (and/or DB access parts) that can access the primary VOL, the ID of the secondary VOL that is the copying destination in this copying mode, and the IDs of servers (and/or DB access parts) assigned as servers (and/or DB access parts) that can access this secondary VOL, are also registered. Furthermore, the pair state is a state relating to volume pairs. For example, a state of "pair" in which a volume pair is formed and copying is performed from the primary VOL to the secondary VOL, a state pf "reversed" in which a volume pair is formed and copying is performed from the secondary VOL to the primary VOL, and a state of "dissolve" in which a volume pair is not formed, can be used.

It is seen how data can be written with log blocks or VOL blocks being respectively written either synchronously or asynchronously in either copying direction (the forward direction involving copying from the primary VOL to the secondary VOL or the reverse direction involving copying from the secondary VOL to the primary VOL) according to the DB-VOL mapping table 67A shown in FIG. 5A and the remote copying control table 87A shown in FIG. 5B.

For example, by referring to the DB-VOL mapping table 67A, the DB access part 1A-1 can specify that the data base region that can be accessed by this access part itself is at least one of the data base regions with the data base region IDs "DBAREA 1", "LOG 1" and "LOG 2". For instance, in cases where the log block is to be stored in a data base region with a data base region ID of "LOG 1", the DB access part 1A-1 specifies the primary storage subsystem ID of "CTL #A1" and primary VOL ID of "VOL 12-A" corresponding to the abovementioned ID from the table 67A, and issues a write request to write the abovementioned log block into the primary log VOL of the specified storage subsystem. Furthermore, in the storage subsystem that has received this write request, the remote copying processing part 83A specifies from the remote copying control table 87A that the copying mode corresponding to the primary storage subsystem ID "CTL #A1" and primary VOL ID "VOL 12-1" constituting the destination of the issuance of the write request is "synchronous", that the pair state is "pair", that the corresponding secondary storage subsystem is "CTL #B2", and that the secondary VOL ID is "VOL 21-B". As a result, synchronous remote copying processing in the forward direction is performed by the remote copying processing parts 83A and 83B, and the log block of the data base region ID "LOG 1" (the log block received by the primary storage subsystem from the first server 15) is written into the secondary log VOL corresponding to the secondary storage subsystem "CTL #B2" and secondary VOL ID "VOL 21-B".

According to the abovementioned FIGS. 5A and 5B, there may be cases in which at least one data base region is assigned to one DB access part (and/or one server 15A, 17A, 15B or 17B); however, there is no assignment of one data base region to a plurality of DB access parts (and/or a plurality of servers) at the same time. Specifically, in the present embodiment, a given data base region is constructed so that certain DB access parts (and/or servers) that are associated with this data base region in the table 68A (and/or the table 87A) can be updated, while DB access parts (and/or servers) that are not associated in this manner cannot be updated.

This embodiment will be described in greater detail below. Furthermore, in the following description, the ID of the first site 1A is designated as "site A", and the ID of the second site 1B is designated as "site B". The ID of the first server 15A is designated as "server A1", the ID of the first server 17A is designated as "server A2", the ID of the second server 15B is designated as "server B1", and the ID of the second server 17B is designated as "server B2". In the following description, there may be instances in which the sites or servers are described using these IDs.

FIG. 6A shows one example of the information that is controlled by the inter-site monitoring server 49.

In the inter-site monitoring server 49, for example, information is controlled by the inter-site monitoring software 25 using the storage region 27. For instance, this information includes a server state table 104 and a monitoring result table 103.

The server state table 104 is a table that is used to control the respective servers located in the respective sites 1A and 1B. For example, the ID of the site where the server is located, the ID of the server, the length of the response waiting time and the state of the server are registered for each server in the server state table 104. Here, the length of the response waiting time refers to the length of the waiting time until the response from the server arrives. A threshold value for this response waiting time length may also be stored in the storage region 27. For example, three types of states, e. g., "normal", "trouble" (indicating that trouble has occurred) and "stopped" (indicating that the site has intentionally been stopped) may be used as server states.

For example, in cases where the length of the waiting time for the response from a certain server exceeds a specified waiting time length threshold value, the inter-site monitoring software 25 alters the state of this server from "normal" to "trouble". Furthermore, in cases where it is detected that the states of all of the servers located in a given site are "trouble" in the server state table 104, the inter-site monitoring software 25 alters the state of this site from "normal" to "trouble" in the monitoring result table 103.

FIG. 6B shows an example of the construction of the DB access control table.

The DB access control table 101 is a table that is used to control information relating to the DB access parts located in the servers. For example, this table 101 can be stored in the storage region 27 of the inter-site monitoring server 49. However, the present invention is not limited to this; for example, this table can also be stored in the storage regions 69A of the first servers 15A and 17A, and/or the storage regions 69B of the second servers 15B and 17B. For example, the ID of the DB access part (subserver ID), the ID of the site where the DB access part is located, an indication as to whether the DB access part is currently in use or is used for standby, the state of the DB access part (e. g., "normal", "trouble" or "stopped"), and the IDs of the servers where the DB access part and other DB access part corresponding to this DB access part are located, are registered in the DB access part control table 101 for each of all (or some) of the DB access parts located in the data processing system 3 (e. g., the plurality of DB access parts located in a certain server). Furthermore, for each DB access part, the ID of another DB access part corresponding to this DB access part can be registered in the DB access part control table 101 in association with the ID of the server containing this other DB access part. Furthermore, for example, the ID of the server (main server) in use, the ID of the standby server corresponding to this server in use, the ID of the server currently in use on the secondary side corresponding to this first server in use, or the ID of the standby server corresponding to this server currently in use on the secondary side, can be used as the registered server ID.

For instance, the inter-site monitoring server 49 (and/or first server monitoring part 19A) can specify various types of information for the respective DB access parts by referring to the DB access part control table 101. Furthermore, the inter-site monitoring server 49 can execute various types of processing on the basis of the specified contents.

Figure 7:
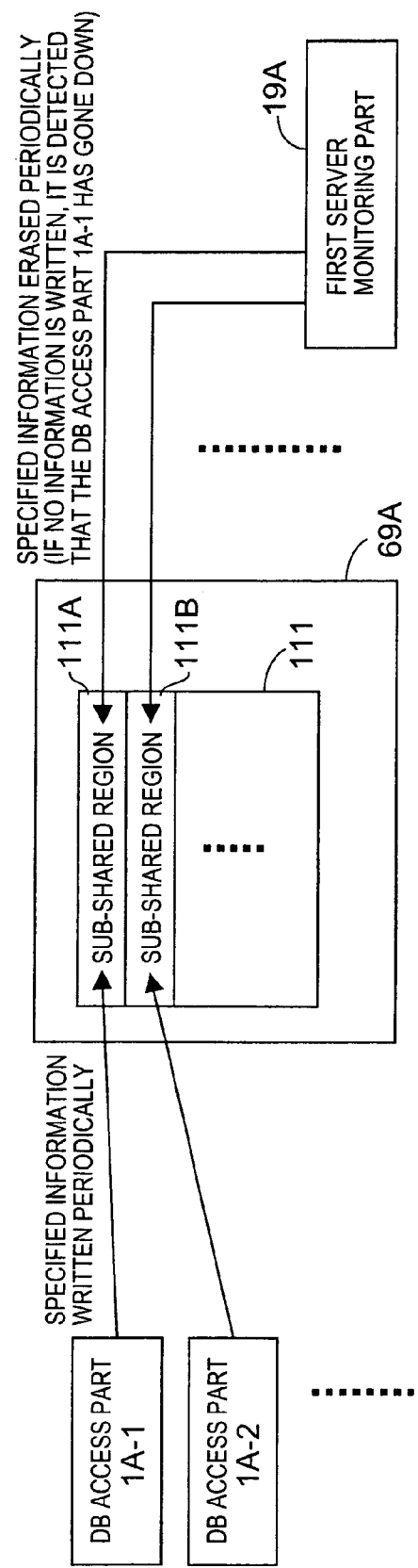
FIG. 7 is a diagram used to illustrate one example of the method whereby the server monitoring part monitors the respective DB access parts in a certain server.

FIG. 7 is a diagram used to illustrate one example of the method whereby the server monitoring part monitors the respective DB access parts in a certain server.

This FIG. 7 uses the first server 15A as an example. For instance, a specified shared region 111 is prepared in the storage region 69A in the first server 15A. A plurality of sub-shared regions 111A, 111B, . . . which are respectively assigned to a plurality of DB access parts are located in the shared region 111.

In this construction, for example, the DB access part 1A-1 periodically (or irregularly) accesses the sub-shared region 111A that is assigned to this DB access part 1A-1, and writes specified information (e. g., sets a flag) in this region 111A. Meanwhile, the first server monitoring part 19A periodically (or irregularly) accesses the sub-shared region 111A, and if information is written into this sub-shared region 111A, the first server monitoring part 19A updates this information to other information, or deletes this information (i. e., lowers the flag). Here, in cases where specified information is not written into the sub-shared region even after the first server monitoring part 19A has accessed the sub-shared region 111A a specified number of times (e. g., one or more times), it is judged that the DB access part 1A-1 has gone down, and the state of this DB access part 1A-1 is updated to "trouble" in the DB access part control table 101. Subsequently, in cases where it is detected that the specified information has been written, the first server monitoring part 19A updates the state of the DB access part 1A-1 to "normal".

The abovementioned monitoring method can also be applied to other DB access parts such as 1A-2 and the like. Furthermore, the monitoring of the DB access parts is not limited to this method; other methods (e. g., methods using a heartbeat) can also be employed. Moreover, the above-mentioned monitoring method may be used as the monitoring method performed by the inter-site monitoring server 49; however, various other methods can also be used as the monitoring method performed by the inter-site monitoring server 49.

Figure 8:
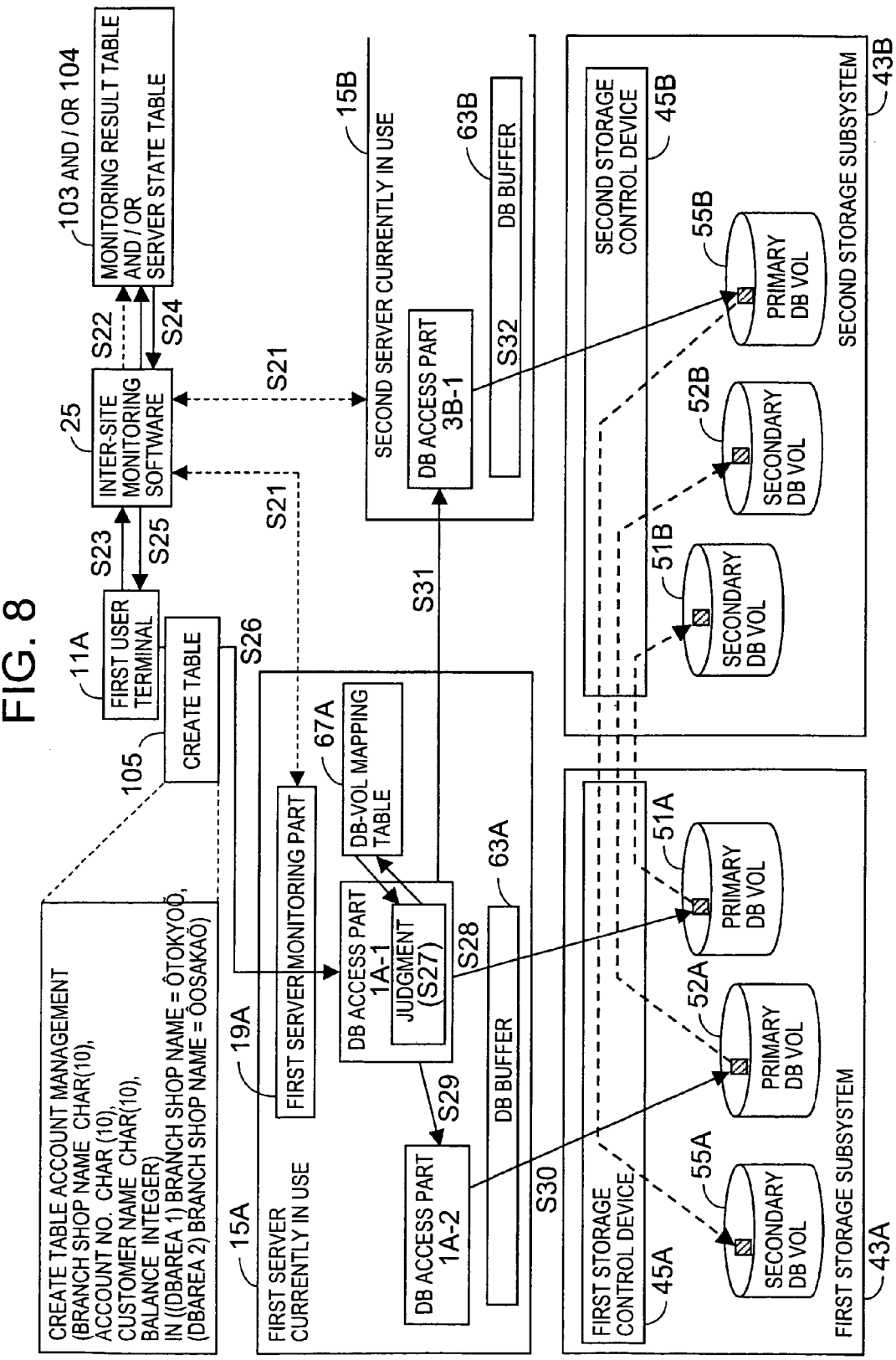
FIG. 8 shows an outline of one example of the flow of one processing operation that is performed in the data processing system constituting an embodiment of the present invention.

FIG. 8 shows an outline of one example of the flow of one of the processing operations performed in the data processing system constituting an embodiment of the present invention.

For example, the inter-site monitoring software 25 can monitor the states of the respective servers 15A, 15B, 17A and 17B by communicating with the server monitoring parts of the respective servers. Furthermore, for example, the inter-site monitoring software 25 can also monitor the states of the respective DB access parts in the respective servers by receiving notification of the states of the DB access parts monitored by the server monitoring parts of the respective servers from these server monitoring parts.

Here, for example, the inter-site monitoring software 25 monitors at least the servers 15A and 15B in use (S21). On the basis of the results of this monitoring, the inter-site monitoring software 25, if necessary (e. g., in cases where trouble occurs in a server that was normal), causes the monitoring results to be reflected in the monitoring result table 103 and/or server state table 104 (S22).

For example, in cases where the first user terminal 11A is to be connected to the first site 1A, the first user terminal 11A accesses the inter-site monitoring server 49, and inquires as to the state of the first site 1A (S23). This processing may be performed in response to an operation by the user, or may be automatically performed by a computer program installed in the first user terminal 11A.

In response to this inquiry, the inter-site monitoring software 25 acquires the state of the first site 1A from the monitoring result table 103 (S24), and transmits information indicating the acquired state to the first user terminal 11A that was the source of the inquiry (S25).

In cases where the state indicated by the information received from the inter-site monitoring software 25 is "normal", the first user terminal 11A issues a desired query to the first site 1A (S26). Here, for example, the first user terminal 11A can issue a query using the ID (e. g., IP address) of the first server 15A in use, or the ID (e. g., IP address) of the DB access part in use. Furthermore, a "create" table 105 can be used for the query that is issued. For example, in addition to elements such as CHAR(n) or the like representinging a place number n, the ID (e. g., DBAREA 1, DBAREA 2) of the data base region that is the storage destination of the data is noted in the "create" table 105.

The query (e. g., "create" table 105) that is issued from the first user terminal 11A is received by (for example) the DB access part 1A-1 in use. For example, this is accomplished as follows. In cases where a DB access part control table 101 is provided in the first server 15A, the first server monitoring part 19A of the first server 15A can judge whether or not the DB access part 1A-1 in use is normal by referring to the DB access part control table 101. In cases where the DB access part 1A-1 is judged to be normal, the DB access part 1A-1 can be assigned to the first user terminal 11A to receive the query from the first user terminal 11A.

On the basis of the content of the query (e. g., "create" table 105) and the DB-VOL mapping table 67A, the DB access part 1A-1 performs a judgment as to whether to access a logical volume within the site by the DB access part 1A-1 itself, or whether to cause another DB access part to access such a logical volume (S27). In concrete terms, for example, the DB access part 1A-1 grasps the primary storage subsystem ID, primary VOL ID and the like associated with the data base region ID noted in the query from the DB-VOL mapping table 67A.

For example, in cases where it is judged in S27B that the DB access part 1A-1 itself will access a logical volume, the DB access part 1A-1 writes a DB block generated by transaction processing (e. g., a block of data defined by COMMIT) into the primary DBVOL 51A corresponding to the DB access part 1A-1 itself via the DB buffer 63A (S28).

Furthermore, for example, in cases where it is judged in S27B that the DB access part 1A-2 is to access the logical volume, the DB access part 1A-1 instructs the DB access part 1A-2 to access the logical volume (S29). In this case, the DB access part 1A-2 writes a DB block generated by transaction processing into the primary DBVOL 52A corresponding to the DB access part 1A-2 itself via the DB buffer 63A (S30). For example, notification of the ID of the VOL 52A that is the writing destination may be made from the DB access part 1A-1, or this ID may be specified by the DB access part 1A-2 from the data base region ID.

Furthermore, for example, in cases where it is judged in S27B that the DB access part 3B-1 located in the second server 15B in use in the second site 1B is to access the logical volume, the DB access part 1A-1 instructs the DB access part 3B-1 in the second server 15B of the second site 1B to access the logical volume via the third network 13C (not shown in the figures) or the like from the first server monitoring part 19A (S31). In this case, the DB access part 3B-1 writes a DB block generated by transaction processing into the primary DBVOL 55B corresponding to the DB access part 3B-1 itself via the DB buffer 63B (S32). For example, notification of the ID of the VOL 55B that is the writing destination may be made from the DB access part 1A-1, or this ID may be specified by the DB access part 3B-1 from the data base region ID.

The above is an outline of the flow of one processing operation in the present embodiment. Furthermore, in this embodiment, as was described above, synchronous remote copying processing or asynchronous remote copying processing is performed between the sites. For instance, in the example shown in FIG. 8, let us assume that the states of the primary DBVOL 51A and secondary DBVOL 51B, the states of the primary DBVOL 52A and secondary DBVOL 52B and the states of the primary DBVOL 55B and secondary DBVOL 55A are respectively "pair" in the remote copying control table 87A (and/or 87B) (not shown in the figures). In this case, as is indicated by the dotted line in FIG. 8, asynchronous remote copying processing is performed from the primary DBVOLs to the secondary DBVOLs. This processing is performed by the remote copying processing part 83A of the first storage control device and the remote copying processing part 83B of the second storage control device 45B.

Several concrete examples of the flow of the processing that is performed in the data processing system 3 of the present embodiment will be described below.

FIG. 9 shows one example of the flow of the processing that is performed by the first user terminal 11A. The flow shown in this figure can also be applied to the second user terminal 11B.

The first user terminal 11A queries the inter-site monitoring server 49 regarding the state of the first site 1A (S61).

In cases where the first user terminal 11A receives information indicating the state of the first site 1A in response to this query, if the state indicated by this information is not "trouble" (or "stopped") (YES in S62), the first user terminal 11A sends out a connection request to the DB access part of the first server 15A (S63). Here, for example, the first user terminal 11A may send out a connection request that has the IP address of the first server 15A, or may send out a connection request that has the IP address of a specified DB access part (e. g., 1A-1).

For example, the connection request sent out by the first user terminal 11A is received by the first server monitoring part 19A. The first server monitoring part 19A ascertains the state of the DB access part by referring to the DB access part control table 101. For example, in cases where the first server monitoring part 19A receives a connection request for the first server 15A, the first server monitoring part 19A approves the connection of a specified DB access part among the DB access parts whose states are "normal" to first user terminal 11A (i. e., sends out a connection OK). Furthermore, for example, in cases where the first server monitoring part receives a connection request for the DB access part 1A-1, if the state of this DB access part 1A-1 is "normal", the first server monitoring part 19A sends out a connection OK, while if the state of the DB access part 1A-1 is "trouble" or "stopped", the first server monitoring part 19A does not approve the connection (i. e., sends out a connection NG). Here, for example, if the states of the other DB access parts 1A-2 through 1A-4 are all "normal", the first server monitoring part 19A may connect any of the other DB access parts 1A-2 through 1A-4 to the first user terminal 11A. In this case, a connection OK may be sent out.

In cases where a connection OK is sent out with respect to the connection request of S63, the first user terminal 11A requests specified processing, e. g., transaction processing, from the connected DB access part (S69).

On the other hand, in cases where the first user terminal 11A receives a connection NG from the first server 15A, the first user terminal 11A sends out a connection request to another first server 17A belonging to the same site 1A (S65). In this case, the same processing as that of the first server monitoring part 19A is performed by the first server monitoring part 41A, and a connection OK or connection NG is sent out. Here, in cases where a connection OK is received from the first server 17A, the first user terminal 11A can request specified processing, e. g., transaction processing, from the connected DB access part (S69). Furthermore, in cases where a connection NG is received, the first user terminal 11A can either wait for some time, or send out a connection request to the second server 15B or 17B of the second site 1B.

In cases where the state received in response to the query of S61 is "trouble" or "stopped", the first user terminal 11A executes (for the second site 1B) processing similar to that of the processing of S63 through S65 executed for the first site 1A (S66 through S68).

For example, in cases where trouble occurs in the connected DB access part and this is detected following S69 (YES in S70), S61 is performed again.

FIG. 10 shows one example of the flow of the processing that is performed by the inter-site monitoring software.

The inter-site monitoring software 25 refers to the monitoring result table 103 at a specified timing (e. g., in cases where a query regarding the first site 1A or second site 1B is received from the user terminal 11A or 11B), and acquires the states of the first site 1A and second site 1B (S71 and S72).

If the state of the first site 1A is "trouble" (YES in S73), the inter-site monitoring software 25 queries all of the servers 15A and 17A of the first site 1A regarding the presence or absence of recovery, and waits for a response from all of the servers 15A and 17A (S74). If there is a response from all of the servers 15A and 17A (YES in S74), the inter-site monitoring software 25 causes failback processing to be performed by the respective servers 15A, 17A, 15B and 17B (S75), and updates the state of the first site 1A in the monitoring result table 103 to "normal" (S76). On the other hand, if there is no response from one or more of the servers 15A and/or 17A (NO in S74), the inter-site monitoring software 25 acquires the state of the second site 1B from the monitoring result table 103, and judges whether or not the state of the second site is "trouble" (S78).

If the state of the second site 1B is "trouble" (YES in S79), the inter-site monitoring server 25 queries all of the servers 15B and 17B of the second site 1B regarding the present or absence of recovery, and wait for a response from all of the servers 15B and 17B (S80). If there is a response from all of the servers 15B and 17B (YES in S80), the inter-site monitoring software 25 causes failback processing to be performed by the respective servers 15A, 17A, 15B and 17B (S81), and updates the state of the second site 1B in the monitoring result table 103 to "normal" (S82). On the other hand, if there is no response from one or more of the servers 15B and/or 17B (NO in S80), the inter-site monitoring software 25 acquires the state of the first site 1A from the monitoring result table 103, and judges whether or not the state of the first site is "trouble" (S84).

If the result is YES in S78 or YES in S84, this means that trouble has occurred in both the first site 1A and second site 1B. In this case, the inter-site monitoring software 25 performs specified error processing, e. g., displays a message indicating that trouble has occurred in both sites on a specified node (e. g., the user terminal 11A or 11B that was the source of the query) (S85).

FIG. 11 shows one example of the flow of the monitoring processing with that is performed by the inter-site monitoring software with respect to the servers. For example, this figure uses the flow of monitoring processing for the first server as an example; however, the processing flow shown in this figure can also be applied to the second server.

The inter-site monitoring software 25 acquires the states of the first servers 15A and 17A from the server state table 104 (S71).

In cases where there is a response to the signal for the first server 15A or 17A (YES in S72), if the state corresponding to the server 15A or 17A that is the transmission source of the response is "trouble" or "stopped" in the server state table 104, the inter-site monitoring software 25 updates this state to "normal", and also updates the state of the first site 1A in the monitoring result table 103 to "normal".

In cases where there is no response to the signal for the first server 15A or 17A (NO in S72), the inter-site monitoring software 25 acquires the states of the respective servers 15A and 17A from the server state table 104, and judges the states of the respective servers 15A and 17A (S74).

In cases where the states of both of the servers 15A and 17A are either "trouble" or "stopped" (YES in S74), the inter-site monitoring software 25 executes failover processing to the second site (S77), and updates the state of the first site 1A in the monitoring result table 103 to "trouble" or "stopped" (S78).

In cases where neither the state of the server 15A nor the state of the server 17A is "trouble" or "stopped" (NO in S74), the inter-site monitoring software 25 updates the waiting time lengths of the first servers 15A and 17A in the server state table 104 (S75). The inter-site monitoring software 25 compares the waiting time lengths following updating and a specified waiting time length threshold value, and in cases where the waiting time lengths of both of the servers exceed specified waiting time length threshold value, the inter-site monitoring software 25 executes the processing of S77 and S78. In this case, furthermore, the inter-site monitoring software 25 updates the states of the respective servers 15A and 15B to "trouble" in the server state table 104.

FIG. 12 shows one example of the flow of the intra-site failover processing that is performed in cases where the DB access part 1A-1 of the first server in use has gone down. FIG. 13A is an explanatory diagram of the intra-site failover processing shown in FIG. 12. FIG. 13B shows the monitoring result table 103 in the flow of the intra-site failover processing shown in FIG. 12. FIG. 13C shows the updating results for a certain record of the DB access part control table 101 in the flow of the intra-site failover processing shown in FIG. 12. FIG. 13D shows the updating results for another record of the DB access part control table 101 in the flow of the intra-site failover processing shown in FIG. 12. FIG. 14 shows the updating results for the DB-VOL mapping table 67A in the flow of the intra-site failover processing shown in FIG. 12. Below, one example of the intra-site failover processing will be described with reference to FIGS. 12 through 14.

For example, in cases where trouble occurs in the DB access part 1A-1 so that this DB access part goes down, the first server monitoring part 19A of the first server 15A detects that the DB access part 1A-1 has gone down (S101). Here, since it is not the case that the entire first site 1A has gone down, there is no updating of the monitoring result table 103 by the inter-site monitoring software 25 (as is shown in FIG. 13B).

In cases where the first server monitoring part 19A detects that the DB access part 1A-1 has gone down, the first server monitoring part 19A sends a shutdown request to the DB access part 1A-1 (S102). As a result, the DB access part 1A-1 is caused to shut down. The first server monitoring part 19A temporarily ends the monitoring of the DB access parts inside the server 15A (S103).

The first server monitoring part 19A ascertains the takeover destination of the DB access part 1A-1, i. e., the DB access part (i. e., takeover destination) for standby that becomes the DB access part currently in use instead of the DB access part 1A-1 (S104). For example, the first server monitoring part 19A notifies the inter-site monitoring software 25 that the DB access part 1A-1 has gone down. The inter-site monitoring software 25 refers to the DB access part control table 101, extracts a specified or arbitrary ID from the one or more IDs associated with the DB access part 1A-1 that has gone down, and notifies the first server monitoring part 19A of information relating to the DB access part associated with the extracted ID (e. g., the server in which the DB access part is located or the like). As a result, the first server monitoring part 19A can ascertain the takeover destination.

For example, let us assume that the DB access part ascertained as the takeover destination was the DB access part 2A-1 located in the first server 17A for standby. In this case, the resources relating to the DB access part 1A-1 are taken over by the DB access part 2A-1 between the first server monitoring parts 19A and 41A (S105). In this processing, for example, the IP address of the DB access part 1A-1 is assigned to the DB access part 2A-1, or the ID of the data base region that was assigned to the DB access part 1A-1 (i. e., the ID of the VOL having this data base region) is assigned to the DB access part 2A-1.

The first server monitoring part 19A issues a start request to the DB access part 2A-1 (S106). As a result, the DB access part 2A-1 starts up (S107). As a result, furthermore, the DB access part 2A-1 that was used for standby is now currently in use. When the start processing is completed, the DB access part 2A-1 issues a starting completion notification to the first server monitoring part 19A (and/or inter-site monitoring software 25) (S10).

When the first server monitoring part 19A (and/or inter-site monitoring software 25) receives a starting completion notification from the DB access part 2A-1 (S109), the first server monitoring part 19A causes the results of the processing performed up to this point to be reflected in the DB-VOL mapping table 67A (and/or DB access part control table 101), and re-starts monitoring (S110). Furthermore, the first server monitoring part 19A (and/or inter-site monitoring software 25) issues a switching notification to the first server monitoring part 41A (and/or inter-site monitoring software 25) (S111). When the first server monitoring part 41A (and/or inter-site monitoring software 25) receives such a switching notification (S112), the first server monitoring part 41 causes the results of the processing performed up to this point to be reflected in the DB access part control table 101 and DB-VOL mapping table 67A (and/or DB access part control table 101) (S113).

As a result of the processing of S110, for example, "currently in use" is updated to "standby", and the state is updated to "trouble", for the DB access part 1A-1 in the DB access part control table 101 (see FIG. 13C). Furthermore, if there is also information for the DB access part 2A-1, "standby" is updated to "currently in use" (see FIG. 13D).

Furthermore, as a result of the processing of S110, for example, the server ID of "DB access part 1A-1" is updated to "DB access part 2A-1)" in the DB-VOL mapping table 67A (see FIG. 14).

The updating results of at least FIG. 13D among FIGS. 13C through 14 are also the same for the results of the processing of S113.

FIG. 15 shows one example of the flow of the inter-site failover processing that is performed in cases where the first site 1A goes down. FIG. 16A is an explanatory diagram of the inter-site failover processing shown in FIG. 15. FIG. 16B shows the updating results of the monitoring result table 103 in the flow of the inter-site failover processing of FIG. 15. FIG. 16C shows the updating results for a certain record of the DB access part control table 101B in the flow of the inter-site failover processing shown in FIG. 15. FIG. 16D shows the updating results for another record of the DB access part control table 101B in the flow of the inter-site failover processing shown in FIG. 15. FIG. 17A shows the updating results for the DB-VOL mapping table 67B in the flow of the inter-site failover processing shown in FIG. 12. FIG. 17B shows the updating results for the remote copying control table 87B in the flow of the inter-site failover processing shown in FIG. 12. One example of the inter-site failover processing will be described below with reference to FIGS. 15 through 17B.

For example, in cases where trouble occurs in the first site 1A (e. g., in cases where the states of both the first server 15A and the first server 17A are "trouble"), this is detected by the inter-site monitoring software 25 (S121).

The inter-site monitoring software 25 updates the state of the first site 1A to "trouble" in the monitoring result table 103 (S122 and FIG. 16B), and notifies the respective server monitoring parts 19B and 41B of the second site 1B of this inter-site failover (S123). In FIGS. 15 and 16A, the flow of the processing that is performed in cases where the second server monitoring part 41B of the second server 17B receives notification of the inter-site failover is taken as an example (this flow can also be applied to the other second server monitoring part 19B).

In cases where the second server monitoring part 41B receives notification of inter-site failover, the second server monitoring part 41B instructs the second storage subsystem 43B to dissolve the volume pairs formed by the VOLs accessed by the first site 1A (S125). The reason for this is that since the first site 1A itself is down, there is no need to transmit the updating results for the respective VOLs of the second storage subsystem 43B to the first storage subsystem 43A by remote copying. In this S125, for example, the second server monitoring part 41B refers to the DB-VOL mapping table 67B and DB access part control table 101B, specifies the VOLs that are assigned to the DB access parts of the second server 17B, and that form pairs with VOLS assigned to DB access parts that are located in the first site 1A, and instructs the second storage subsystem 43B to dissolve the volume pairs formed by these specified VOLs. In this case, in response to this command, the second storage control device 45B of the second storage subsystem 43B can update the pair states of the VOLs involved in this command to "dissolved" in the remote copying control table 87B. Furthermore, the primary site ID can also be updated to the ID of the second site (see FIG. 17B).

The second server monitoring part 41B specifies the DB access parts 4A-1 through 4A-4 relating to the first site 1A among the plurality of DB access parts located in the second server 17B, and sends out start requests to the specified DB access parts (S126). For example, the specification of the DB access parts can be accomplished by referring to the DB access part control table 101B. Below, the processing following the output of a start command to the DB access part 4A-1 will be described as an example.

The DB access part 4A-1 starts in response to the start command (S127). As a result, the DB access part 4A-1 that was on standby is switched to "currently in use". When the start processing is completed, the DB access part 4A-1 issues a start completion notification to the second server monitoring part 19B (S128). Furthermore, the second server monitoring part 19B can send this start completion notification to the inter-site monitoring software 25.

When the second server monitoring part 41B (and/or inter-site monitoring software 25) receives the start completion notification (S129), the second server monitoring part 41B causes the results of the processing up to this point to be reflected in the DB-VOL mapping table 67B (and/or DB access part control table 101B). The second server monitoring part 41B begins to monitor the respective DB access parts 4A-1 through 4A-4 (S130).

As a result of the processing of S130, if there is information for the DB access part 1A-1 in the DB access part control table 101B, "currently in use" is updated to "standby", and the state is updated to "trouble" (see FIG. 16C). Furthermore, in regard to the DB access part 4A-1, for example, the state is updated from "standby" to "currently in use" (see FIG. 16D). For example, by referring to the DB-VOL mapping table, the DB access part 4A-1 that was currently in use can judge which VOLs can be accessed by the DB access part 4A-1 itself. Here, for example, the DBVOLs that can be utilized by the DB access part 4A-1 can be the secondary DBVOLs corresponding to the primary DBVOLs that were accessed by the DB access part 1A-1. Furthermore, the inter-site monitoring software 25 controls the resource information (e. g., IP addresses) assigned to the DB access part 1A-1, and by providing this resource into to the first user terminal 11A, it is possible to devise the system so that the DB access part 4A-1 can be accessed in cases where a method in which the first user terminal 11A accesses the DB access part 1A-1 using the abovementioned resource information is employed.

Furthermore, as a result of the processing of S130, for example, the subserver ID of "DB access part 1A-1" is updated to "DB access part 4A-1" in the DB-VOL mapping table 67B (see FIG. 17A).

The above is one example of the flow of the inter-site failover processing. Furthermore, in this description, a situation in which the standby DB access part 4A-1 was switched to "currently in use" was taken as an example; however, the question of which of the standby DB access parts 3A-1 or 4A-1 is switched to "currently in use" may be decided by definition beforehand in a specified location in the system 3 (e. g., this may be defined in the second server monitoring part 19B or 41B), or may be decided according to the results of negotiation with the second server monitoring part 19B or 41B (e. g., by discriminating which of the servers has a smaller load).

FIG. 18 shows one example of the flow of planned switching processing.

Planned switching processing refers to processing in which the first site 1A (or second site 1B) as a whole is caused to go down in a simulated manner, and inter-site failover processing is executed. Since the site in question is merely caused to go down in a simulated manner, the storage subsystem inside the site can actually be operated; as a result, remote copying processing can be performed between the storage subsystem inside the failover destination system and the storage subsystem inside the failover source site (the site that has gone down in a simulated manner). Below, one concrete example of the flow of this planned switching processing will be described using a case in which the first site 1A is caused to go down in a simulated manner as an example.

The inter-site monitoring software 25 issues an instruction for planned switching processing to the first server monitoring parts 19A and 41B of the respective first servers 15A and 15B at a specified timing (e. g., at a predetermined point in time).

For example, when the first server monitoring part 19A receives an instruction for planned switching (S142), the first server monitoring part 19A sends out a stop request to the DB access part in use (e. g., 1A-1) (S143).

When the DB access part 1A-1 receives this stop request (S144), the DB access part 1A-1 executes processing that stops its own operation (i. e., the DB access part 1A-1 shuts down) (S145), and when this processing is completed, the DB access part 1A-1 issues a stop completion notification to the first server monitoring part 19A (S146).

The first server monitoring part 19A causes the results of the processing performed up to this point to be reflected in the DB access part control table 101 or DB-VOL mapping table 67A, and releases the monitoring of the DB access parts 1A-1 through 1A-4 that were currently in use (S147).

The first server monitoring part 19A cuts off the resources (e. g., invalidates the IP addresses of the DB access parts that were currently in use), and notifies the inter-site monitoring software 25 of the end of monitoring (S149).

When the inter-site monitoring software receives notification of the end of monitoring from the first server monitoring parts 19A and 41A, the inter-site monitoring software 25 updates the state of the first site 1A to "stopped" in the monitoring result table 103 (S150). The inter-site monitoring software 25 transmits an inter-site failover notification to the second server monitoring parts 19B and 41B of the respective second servers 15B and 17B (S151).

When the second server monitoring part 41B receives the abovementioned inter-site failover notification (S152), the second server monitoring part 41B executes takeover processing (S153). In concrete terms, for example, the second server monitoring part 41B refers to the DB-VOL mapping table 67B and DB access part control table 101B, specifies the VOLs that are assigned to the DB access parts of the second server 17B, and that form pairs with VOLs assigned to DB access parts located in the first site 1A, and instructs the second storage subsystem 43B to execute reversal and copying of the volume pairs formed by these specified VOLs. In this case, in response to this command, the second storage control device 45B of the second storage subsystem 43B updates the pair state of the VOLs relating to this command to "reversed" in the remote copying control table 87B, and executes remote copying processing from the secondary VOLs to the primary VOLs.

Subsequently, processing similar to that of S126 through S130 in FIG. 15 is performed (S154 through S158).

In the data processing system 3 of this embodiment, as a result of the abovementioned system construction, dual batch processing can be executed. This will be described in detail below.

Figure 19:
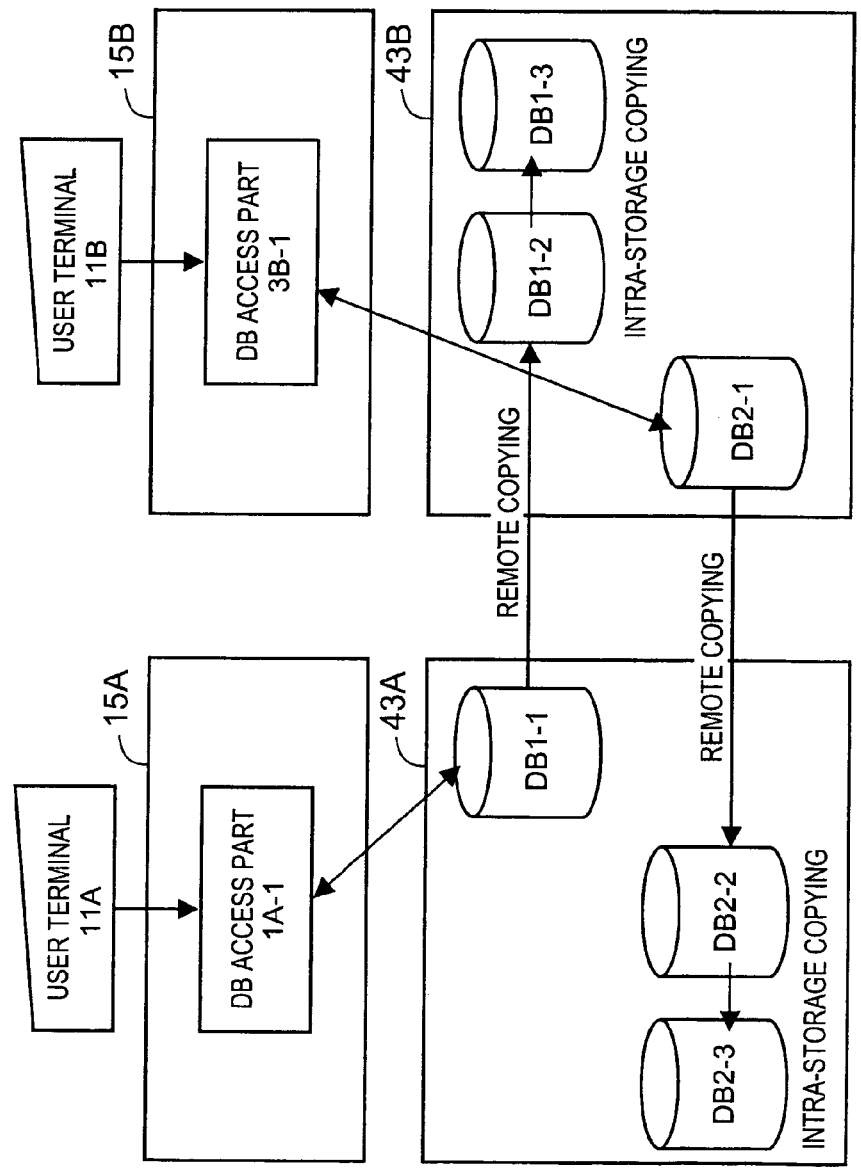
FIG. 19 is an explanatory diagram of the ordinary processing (e. g., on-line processing) that is performed prior to the performance of dual batch processing.

FIG. 19 is an explanatory diagram of the ordinary processing (e. g., on-line processing) that is performed prior to the performance of dual batch processing.

In this embodiment, for example, volume pairs can be constructed not only between the storage subsystems 43A and 43B, but also within the same storage subsystem 43A or 43B. In the example shown in FIG. 19, a volume pair consisting of the primary DBVOL 2-2 and the secondary DBVOL 2-3 can be constructed in the first storage subsystem 43A. Furthermore, a volume pair consisting of the primary DBVOL 1-2 and secondary DBVOL 1-3 can be constructed in the second storage subsystem 43B.

In this embodiment, a volume pair control table 68 such as that shown for example in FIG. 20 is prepared in the storage region 91A of the first storage control device 45A of the first storage subsystem 43A. The pair state, primary VOL ID and secondary VOL ID are registered in the volume pair control table 68 for each VOL pair of the first storage subsystem 43A. By referring to the volume pair control table 68, the disk control processing part 85A of the first storage control device 45A can acquire information relating to the VOL pairs inside the storage subsystem 43A containing this disk control processing part 85A itself. Furthermore, the description in this paragraph can also be applied to the second storage subsystem 43B.

Reference is again made to FIG. 19. In the case of ordinary processing, for example, the DB access part 1A-1 in use in the first site 1A writes a DB block into the into the primary DBVOL 1-1 that is assigned to the DB access part 1A-1 itself. The DB block that is written into the primary DBVOL 1-1 is copied (by the remote copying processing part 83A) from the DBVOL 1-1 to the DBVOL 1-2 that forms a pair with the DBVOL 1-1 (i. e., remote copying is performed). Furthermore, the DB block that is copied into the DBVOL 1-2 is copied into the DBVOL 1-3 that forms a pair with the DBVOL 1-2 by the disk control processing part 85B (i. e., intra-storage copying is performed).

Furthermore, in ordinary processing, in the second site 1B, the DB access part 3B-1 in use writes a DB block into the primary DBVOL 2-1 that is assigned to the DB access part 3B-1 itself. The DB block that is written into the primary DBVOL 2-1 is copied from the DBVOL 2-1 into the DBVOL 2-2 that forms a pair with the DBVOL 2-1 by the remote copying processing parts 83A and 83B (not shown in the figures) (i. e., remote copying is performed). Furthermore, the DB block that is copied into the DBVOL 2-2 is copied into the DBVOL 2-3 that forms a pair with the DBVOL 2-2 by the disk control processing part 85A (i. e., intra-storage copying is performed).

As a result of such a flow, data indicating the processing results corresponding to the respective sites is reflected both the "own" site and the other site, and in the other site, the data indicating the processing results are controlled in a multiplex manner.

Figure 21:
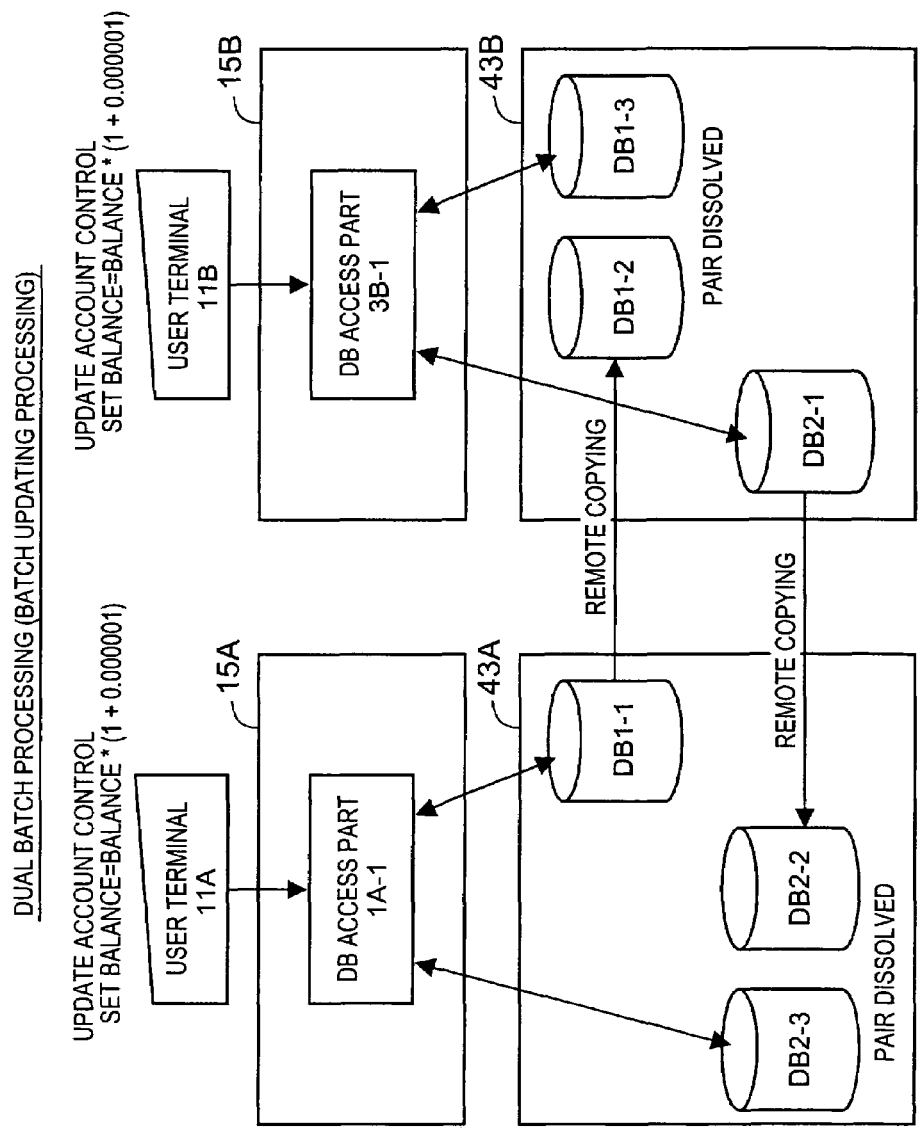
FIG. 21 is an explanatory diagram of the batch updating processing in the dual batch processing.

FIG. 21 is an explanatory diagram of the bath updating processing in the dual batch processing.

In the first site 1A, for example, the first server monitoring part 19A instructs the first storage subsystem 43A to dissolve the VOL pairs that are formed inside the first storage subsystem 43A. In response to this command, the first storage control device 45 refers to the volume pair control table 68, specifies the VOL pairs that are located inside the first storage subsystem 43A, and updates the state of the specified VOL pairs to "dissolved". Similar processing is performed in the second site 1B as well; as a result, the VOL pairs located inside the second storage subsystem 43B are eliminated.

Subsequently, in response to a query from the first user terminal 11A, the DB access part 1A-1 executes batch processing. In concrete terms, the DB access part 1A-1 executes processing that responds to such a query from first user terminal 11A, and causes the results of this processing to be reflected in both the DBVOL 1-1 that is assigned to the DB access part 1A-1 itself, and the DBVOL 2-3 that was an secondary VOL prior to the VOL pair dissolution (i. e., the VOL 2-3 that was not a constituent element of the pair used for remote copying) (in other words, the same data is written into the DBVOLs 1-1 and 2-3). Since the DBVOL 1-1 forms a VOL pair with the DBVOL 1-2 of the second storage subsystem, the updating results for the DBVOL 1-1 are reflected in the DBVOL 1-2 as a result of the abovementioned remote copying processing.

The DB access part 3B-1 in the second site 1B also receives a query from the second user terminal 11B that is the same as the query sent out by the first user terminal 11A (e. g., a request for the product of a bank account balance and a specified interest rate); as a result, the same batch processing as that of the DB access part 1A-1 is performed. The processing result data of this batch processing is reflected in both the DBVOL 2-1 that is assigned to the DB access part 3B-1, and the DBVOL 1-3 that was an secondary VOL prior to the dissolution of the VOL pairs (i. e., the VOL 1-3 that was not a constituent element of the pair used for remote copying) (in other words, the same data is written into the DBVOLs 2-1 and 1-3). Since the DBVOL 2-1 forms a VOL pair with the DBVOL 2-2 of the first storage subsystem, the updating results for the DBVOL 2-1 are reflected in the DBVOL 2-2 as a result of the abovementioned remote copying processing.

Consequently, as a result of such batch updating processing, the VOL pairs are dissolved; however, the data inside the DBVOL 2-3 and the data inside the DBVOL 2-2 can be made the same, and similarly, the data inside the DBVOL 1-2 and the data inside the DBVOL 1-3 can be made the same.

Let us assume for example that the connection between the first server 15A and the first storage subsystem 43A is cut off as a result of the occurrence of trouble in a case where such batch updating processing is being performed. In this case, the inability to obtain data compatibility due to the occurrence of trouble is prevented by performing the recovery processing described below.

Figure 22:
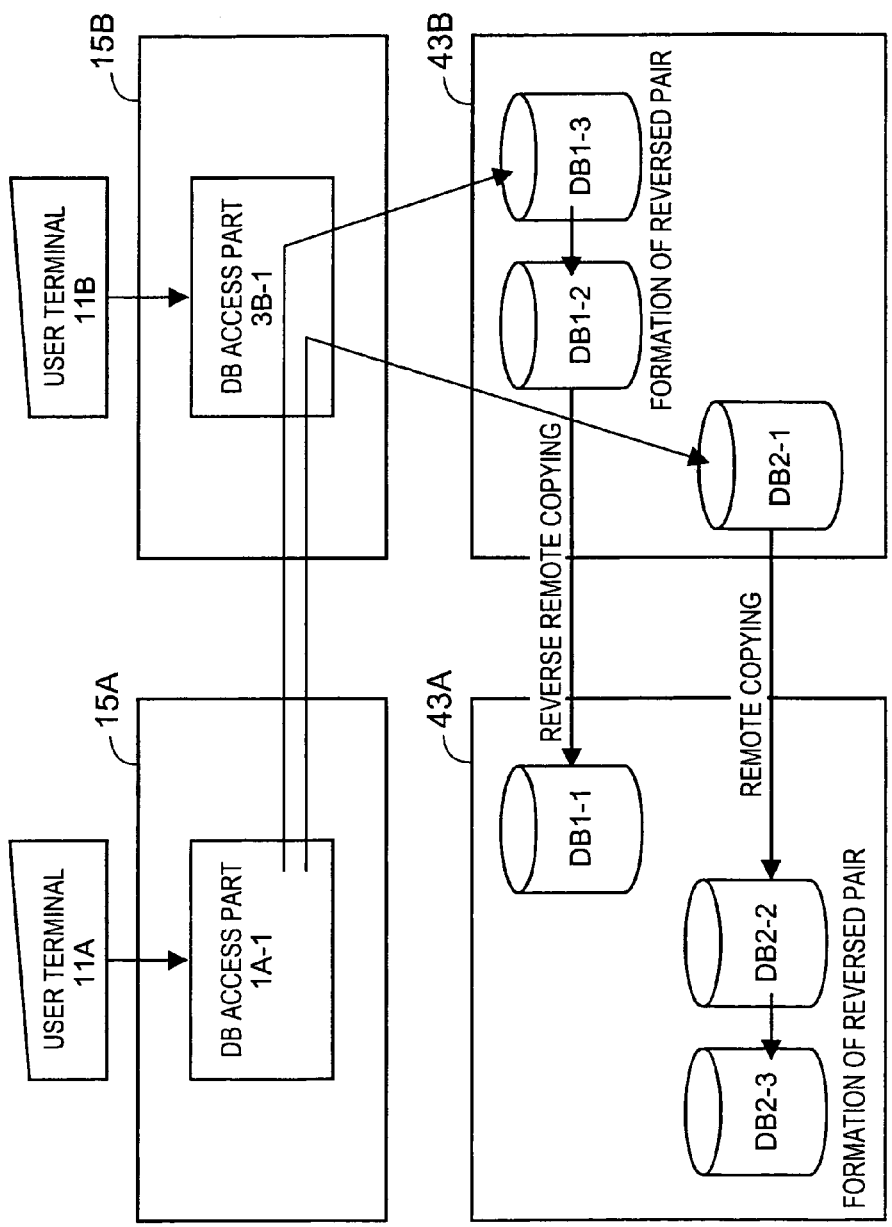
FIG. 22 s an explanatory diagram of the data recovery processing in the dual batch processing.

FIG. 22 is an explanatory diagram of the data recovery processing in dual batch processing.

For instance, assuming that the connection between the first server 15A and first storage subsystem 43A is cut off as a result of the occurrence of trouble in a case where the batch updating processing shown for example in FIG. 21 is being performed, the updated content of the DBVOL 1-1 is an updated content that is older than the updated content of the DBVOL 1-3. Furthermore, the updated content of the DBVOL 2-3 is an updated content that is older than the updated content of the DBVOL 2-1.

First, processing that causes the relationship of the VOL pair prior to the occurrence of trouble to be reflected is performed. In concrete terms, for example, the pair states of at least one of the remote copying control tables 87A and 87B are updated to "reversed" by at least one of the storage control devices 45A and 45B. Furthermore, for example, the pair states of the volume pair control table 68 are updated from "dissolved" to "reversed" by the respective storage control devices 45A and 45B. At least one of these processing operations can be executed by at least one of the storage control devices 45A and 45B receiving a "reverse" command from a certain node. For example, this certain node can be set as the server 15A or 15B belonging to the same site.

For example, the storage control device 45B copies the data inside the DBVOL 1-3 into the DBVOL 1-2 in accordance with the volume pair control table 68B following updating. Furthermore, the storage control device 45B copies the data inside the DBVOL 1-2 into the DBVOL 1-1 inside the first storage subsystem 43A in accordance with the remote copying control table 87B following updating.

Furthermore, the storage control device 45B copies the data inside the DBVOL 2-1 into the DBVOL 2-2 inside the first storage subsystem 43A in accordance with the remote copying control table 87B following updating. The first storage control device 45A copies the data inside the DBVOL 2-2 into the DBVOL 2-3 in accordance with the volume pair control table 68A following updating.

As a result of this recovery processing, data incompatibility arising from the occurrence of trouble can be prevented.

Preferred embodiments of the present invention were described above. However, these embodiments are merely examples used to illustrate the present invention; the scope of the present invention is not limited to these embodiments alone. The present invention can be worked in various modifications as well. For example, it is not absolutely necessary to install a plurality of servers in each site; it is sufficient if at least one server 15A or 15B is present in each site. Furthermore, for example, in the switching of the DB access parts from "standby" to "currently in use", it is not absolutely necessary that the inter-site monitoring server start the DB access part for standby by sending out a start command to the DB access part that is the switching destination. In concrete terms, for example, it would also be possible to leave the standby DB access part in a standby state (e. g., a state in which this part is loaded into the memory from a disk), and to switch the "standby use" to "currently in use" when information relating to resources currently in use are taken over by standby use.

What is claimed is:

1. A data processing method in which a first site comprises a first database (DB) access part currently in use, a primary first storage device that is assigned to said first DB access part currently in use, and a secondary second storage device that forms a pair with a primary second storage device;
a second site comprises a second DB access part currently in use, a first DB access part for standby that corresponds to said first DB access part currently in use, said primary second storage device that is assigned to said second DB access part currently in use, and a secondary first storage device that forms a pair with said primary first storage device, and that is assigned to said first DB access part for standby; and
an inter-site monitoring server is provided which monitors a first object of monitoring that is at least one of said first DB access part currently in use, a first server comprising said first DB access part currently in use, and said first site, and a second object of monitoring that is at least one of said second DB access part in use, a second server comprising said second DB access part currently in use, and said second site;
said data processing method comprising the steps of:
said first DB access part in use writing data into said primary first storage device;
copying the data that is written into said primary first storage device into said secondary first storage device;
said second DB access part in use writing data into said primary second storage device;
copying the data that is written into said primary second storage device into said secondary second storage device;
said inter-site monitoring server detecting that said first DB access part currently in use has gone down; and
said inter-site monitoring server switching said first DB access part for standby from for-standby to currently in use after detecting tat said first DB access part currently in use has gone down.

2. The data processing method according to claim 1, wherein said first site has first DB access part for standby corresponding to said second DB access part currently in use, and said method further comprises a step in which said inter-site monitoring server switches said other first DB access part for standby from for-standby to currently in use after detecting that said first DB access part in use has gone down.

3. The data processing method according to clam 1, wherein said method further comprises the steps of:
said inter-site monitoring server storing DB access pan relationship information constituting information that represents the correspondence relationship between the first DB access part currently in use and first DB access part for standby; and
said inter-site monitoring server specifying said first-DB access part for standby corresponding to the first DB access part currently in use that has gone down by referring to the DB access part relationship information; and
wherein, in said switching step, said specified first DB access part for standby is switched from for-standby to currently in use.

4. The data processing method according to claim 1, comprising the steps of:
said inter-site monitoring server registering monitoring result information which indicates whether or not said first object of monitoring and second object of monitoring are normal;
said inter-site monitoring server updating said monitoring result information in accordance with monitoring results for said first object of monitoring and said second object of monitoring;

said inter-site monitoring server receiving inquiries as to whether or not said first object of monitoring is accessible from a client terminal issuing an access request for said first object of monitoring;

said inter-site monitoring server judging whether or not said client terminal can access said first abject of monitoring by referring to the monitoring result information;

said inter-site monitoring server transmitting the result of said judgment to said client terminal; and said client terminal sending an access request to said first object of monitoring if it is judged to be accessible.

5. The data processing method according to claim 1, wherein said first site has a plurality of first access parts currently in use, and a plurality of primary first storage devices;

said second site has a plurality of first DB access parts for standby, and a plurality of secondary first storage devices that respectively correspond to said plurality of primary first storage devices;

said first DB access parts currently in use and said DB access parts for standby are associated with each other in one-to-one manner; and said DB access parts currently in use and said primary first storage devices are also associated with each other in one-to-one manner.

6. The data processing method according to claim 1, wherein said second site has an additional secondary first storage device that forms a pair with said secondary first storage device, and said first site has an additional secondary second storage device that forms a pair with said secondary second storage device, said method comprising the steps of:

copying first data stored in said secondary first storage device into said additional secondary first storage device in said second site;

copying second data stored in said secondary second storage device into said additional secondary second storage device in said first site;

dissolving the pair of said secondary first storage device and said additional secondary first storage device in said second site;

dissolving the pair afraid secondary first storage device and said additional secondary first storage device in said first site;

said first DB access part currently in use writing new first data into both said primary first storage device and said additional secondary second storage device;

said second DB access part currently in use writing new second data into both said primary second storage device and said additional secondary first storage device;

forming a pair consisting of said secondary first storage device and said additional secondary first storage device in said second site in cases where recovery from trouble is effected following the occurrence of such trouble in said first object of monitoring;

forming a pair consisting of said secondary first storage device and said additional secondary first storage device in said first site;

copying said new second data stored in said additional secondary first storage device into said secondary first storage device in said second site;

storing said new second data written into said secondary first storage device in said primary first storage device of said first site;

copying said new second data stored in said primary second storage device into said secondary second storage device; and copying said new second data copied into said secondary second storage device into said additional secondary second storage device in said first site.

7. The data processing method according to claim 1, wherein said first site further comprises a second DB access part for standby which corresponds to said second DB access part currently in use, said method comprising the steps of:

said inter-site monitoring server detecting that said second DB access part currently in use has gone down; and said inter-site monitoring server switching said second DB access part for standby from for-standby to currently in use after detecting that said second DB access part currently in use has gone down.

8. A device comprising:

a first site having a first database (DB) access part currently in use, a primary first storage device that is assigned to said first DB access part currently in use, a second DB access part for standby that corresponds to a second DB access part currently in use, and a secondary second storage device that forms a pair with a primary second storage device; and a second site having said second DB access part currently in use, a first DB access part for standby that corresponds to said first DB access part currently in use, said primary second storage device that is assigned to said second DB access part currently in use, and a secondary first storage device that forms a pair with said primary first storage device, and that is assigned to said first DB access part for standby, wherein said first DB access part currently in use writes data into said primary first storage device, and the data that is written into said primary first storage device is copied into said secondary first storage device;

said second DB access part currently in use writes data into said primary second storage device, and the data that is written into said primary second storage device is copied into said secondary second storage device; and wherein said device further comprises a storage region that stores at least one computer program, and a processor that reads in and operates said one or more computer programs from said storage region;

said processor monitors a first object of monitoring that is at least one of said first DB access part currently in use, a first server comprising said first DB access part currently in use, and said first site, and a second object of monitoring that is at least one of said second DB access part currently in use, a second server comprising said second DB access part currently in use, and said second site;

in cases where it is detected by said monitoring that said first DB access part currently in use has gone down, said processor switches said first DB access part for standby from for-standby to currently in use, while in cases where it is detected by said monitoring that said second DB access part currently in use has gone down, said processor switches said second DB access part for standby from for-standby to currently in use.

9. A computer-readable computer program on a storage medium wherein a first site has a first database (DB) access part currently in use, a primary first storage device that is assigned to said first DB access part currently in use, a second DB access part for standby that corresponds to a second DB access part currently in use, and a secondary second storage device that forms a pair with a primary second storage device;
  second site has said second DB access part currently in use, a first DB access part for standby that corresponds to said first DB access part currently in use, said primary second storage device that is assigned to said second DB access part currently in use, and a secondary first storage device that forms a pair with said primary first storage device, and that is assigned to said first DB access part for standby;
  said first DB access part currently in use writes data into said primary first storage device, and the data that is written into said primary first storage device is copied into said secondary first storage device;
  said second DB access part currently in use writes data into said primary second storage device, and the data that is written into said primary second storage device is copied into said secondary second storage device;
and said computer program causes a computer to execute the steps of:

monitoring a first object of monitoring that is at least one of said first DB access part currently in use, a first server comprising said first DB access part currently in use, and said first site, and a second object of monitoring that is at least one of said second DB access part currently in use, a second server comprising said second DB access part currently in use, and said second site;

switching said first DB access part for standby from for-standby to currently in use in cases where it is detected by said monitoring that said first DB access part currently in use has gone down; and switching said second DB access part for standby from for-standby to currently in use in cases where it is detected by said monitoring that said second DB access part currently in use has gone down.

* * * * *